United States Patent
Helmstetter et al.

(10) Patent No.: US 11,453,429 B2
(45) Date of Patent: Sep. 27, 2022

(54) STEERING WHEEL ASSEMBLY

(71) Applicants: ZF Passive Safety Systems US Inc., Washington, MI (US); ZF Automotive Germany GmbH, Alfdorf (DE)

(72) Inventors: Matthias Helmstetter, Aschaffenburg (DE); Jeff Harvey, Sterling Heights, MI (US); Christopher Baucher, Washington, MI (US); Marco Tumminello, Niedernberg (DE); Christopher Staab, Haibach (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 119 days.

(21) Appl. No.: 16/851,401

(22) Filed: Apr. 17, 2020

(65) Prior Publication Data
US 2021/0323594 A1 Oct. 21, 2021

(51) Int. Cl.
*B62D 1/04* (2006.01)
*B62D 1/06* (2006.01)
*B60R 21/203* (2006.01)
*B62D 1/10* (2006.01)
*B62D 5/04* (2006.01)

(52) U.S. Cl.
CPC .............. *B62D 1/04* (2013.01); *B62D 1/06* (2013.01); *B60R 21/203* (2013.01); *B62D 1/10* (2013.01); *B62D 5/0445* (2013.01)

(58) Field of Classification Search
CPC ... B62D 1/04; B62D 1/06; B62D 1/10; B62D 1/11; B62D 1/183; B62D 5/0445; B60R 21/203
See application file for complete search history.

(56) References Cited

U.S. PATENT DOCUMENTS

| | | | | |
|---|---|---|---|---|
| 10,501,108 B2 * | 12/2019 | Beauregard | ............ | B62D 1/183 |
| 10,562,558 B1 * | 2/2020 | Spahn | ............ | B62D 1/04 |
| 10,569,799 B2 * | 2/2020 | Kim | ............ | B62D 1/185 |
| 10,654,511 B1 * | 5/2020 | Cao | ............ | B62D 1/06 |
| 10,800,441 B2 * | 10/2020 | Board | ............ | B62D 1/14 |
| 10,906,575 B2 * | 2/2021 | Riedel | ............ | B62D 1/08 |
| 11,148,700 B1 * | 10/2021 | Helmstetter | ............ | B60R 21/203 |
| 2017/0297606 A1 | 10/2017 | Kim et al. | | |
| 2021/0316776 A1 * | 10/2021 | Ko | ............ | B62D 1/16 |

(Continued)

FOREIGN PATENT DOCUMENTS

| | | | | |
|---|---|---|---|---|
| DE | 102010055589 A1 * | 6/2012 | ............ | B62D 1/06 |
| DE | 102018010022 A1 * | 7/2019 | ............ | B62D 1/181 |
| DE | 102018215625 A1 * | 3/2020 | ............ | B62D 1/06 |

(Continued)

Primary Examiner — Adam D Rogers
(74) Attorney, Agent, or Firm — Tarolli, Sundheim, Covell & Tummino LLP

(57) ABSTRACT

A steering wheel assembly for a vehicle includes a support member connectable to vehicle steering column. A steering wheel has first and second rim portions that are pivotable about first and second pivot axes, respectively, between a steering position and a folded position. At least one linear actuator is connected to the support member and operably connected to the first and second rim portions. Actuation of the linear actuator pivots the first and second rim portions about the first and second pivot axes.

23 Claims, 24 Drawing Sheets

(56) References Cited

U.S. PATENT DOCUMENTS

2021/0387660 A1* 12/2021 Helmstetter ......... B62D 5/0445

FOREIGN PATENT DOCUMENTS

| EP | 3800108 | A1 | * | 4/2021 | ............... | B62D 1/10 |
| FR | 2861657 | A1 | * | 5/2005 | ............... | B62D 1/04 |
| FR | 3066988 | A1 | * | 12/2018 | ............... | B62D 1/04 |
| FR | 3067317 | A1 | * | 12/2018 | ............. | B62D 1/183 |
| KR | 102183411 | B1 | * | 11/2020 | | |
| WO | WO-2017060149 | A1 | * | 4/2017 | ............... | B62D 1/06 |

* cited by examiner

STEERING WHEEL ASSEMBLY

FIELD OF THE INVENTION

The present invention relates to a steering wheel assembly for a vehicle. More particularly, the present invention relates to a steering wheel assembly for a vehicle having a steering wheel that is movable between a steering position and a folded position.

BACKGROUND OF THE INVENTION

Certain vehicles are capable of switching between a driver operating mode in which the driver operates the vehicle and an autonomous operating mode in which the vehicle operates with little or no driver input. In vehicles that are switchable between driver and autonomous operating modes, a steering wheel of the vehicle typically remains in the same position regardless of what operating mode the vehicle is in.

SUMMARY OF THE INVENTION

According to one aspect, a steering wheel assembly for a vehicle includes a support member connectable to vehicle steering column. A steering wheel has first and second rim portions that are pivotable about first and second pivot axes, respectively, between a steering position and a folded position. At least one linear actuator is connected to the support member and operably connected to the first and second rim portions. Actuation of the linear actuator pivots the first and second rim portions about the first and second pivot axes relative.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
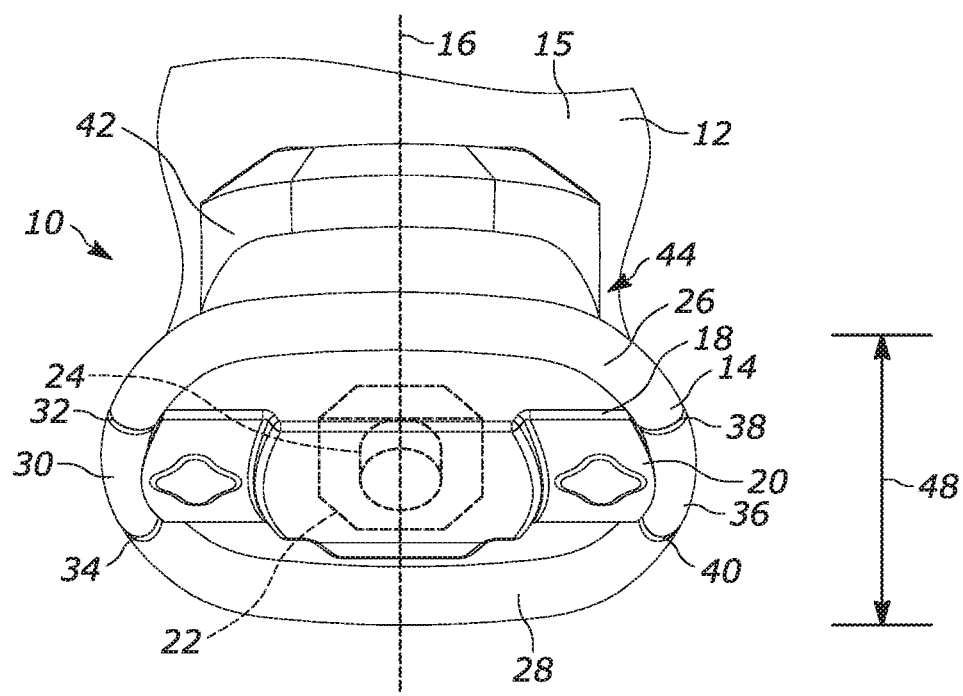
FIG. 1 is a front view of a steering wheel assembly having a steering wheel in a first position.

FIG. 1 illustrates a steering wheel assembly 10 for a vehicle 12. The steering wheel assembly 10 includes a steering wheel 14 connected to a steering column that extends through a dashboard or support surface 15 of the vehicle 12. The steering wheel 14 is rotatable about a steering axis 16 relative to the dashboard or support surface 15. The steering wheel assembly 10 also includes an airbag module 18. The airbag module may be connected to the steering wheel 14 in any desired manner. The airbag module 18 has a housing 20, an airbag 22 and an inflator 24. The airbag 22 is inflatable from a stored condition in which the airbag is stored in the housing 20 to a deployed condition in which the airbag is positioned between a vehicle occupant and the steering wheel 14. The inflator 24 is in the housing 20 and configured to provide inflation fluid to the airbag 22 to inflate the airbag from the stored condition to the deployed condition.

During operation of the vehicle 12, a vehicle occupant can turn the steering wheel 14 to operate and steer the vehicle. However, there may be periods in which use of the steering wheel 14 is not required, such as when the vehicle 12 is being driven autonomously (i.e., with little or no occupant input) or when the vehicle is parked. During these periods of non-use, the steering wheel 14 can be moved from a steering position to a folded position.

As shown in FIG. 1, in the steering position, the steering wheel 14 can have a generally rounded configuration. The steering wheel 14, in the steering position, has a first or upper rim portion 26 and a second or lower rim portion 28. A first central rim portion 30 extends between first ends 32, 34 of the first and second rim portions 26, 28. A second central rim portion 36 extends between second ends 38, 40 of the first and second rim portions 26, 28. Alternatively, the first and second central rim portions 30, 36 can be formed as one piece with the first rim portion 26 and/or the second rim portion 28. The first and second rim portions 26, 28 extend transverse to the steering axis 16 when in the steering position.

Figure 2:
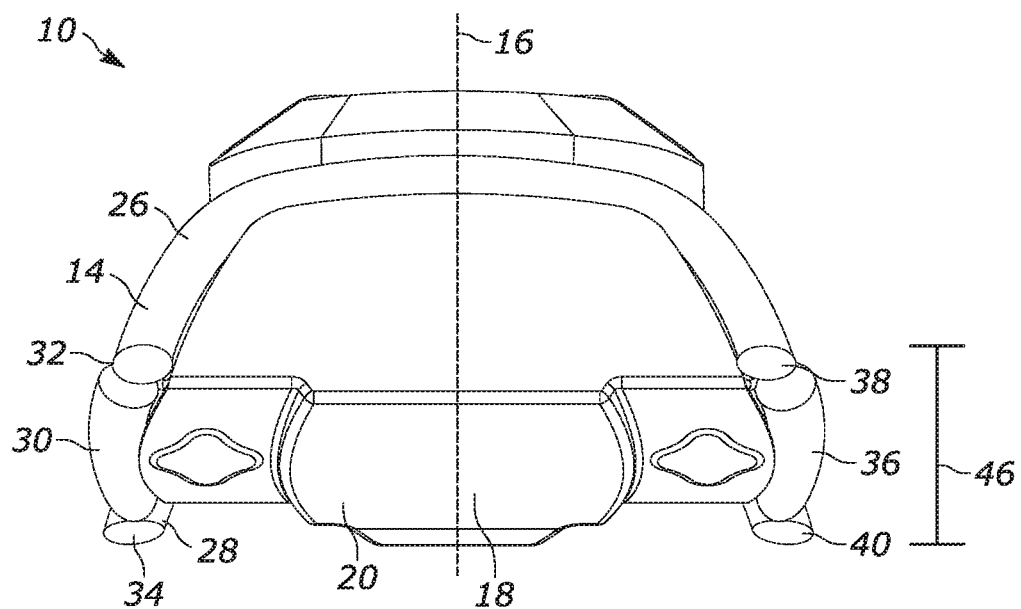
FIG. 2 is a front view of the steering wheel assembly of FIG. 1 having the steering wheel in a second position.

As shown in FIG. 2, when the steering wheel 14 is in the folded position, the first and second rim portions 26, 28 extend generally parallel to and/or in the same general direction as the steering axis 16. When the steering wheel 14 is in the folded position, the first rim portion 26 extends into a first receiving portion 42 in the housing 20 and the second rim portion 28 extends into a second receiving portion 44 in the housing. During the periods of non-use of the steering wheel 14, the first and second rim portions 26, 28 can be moved away from the vehicle occupant so that the vehicle occupant has more space within the vehicle 12 than when the steering wheel is in the steering position. The steering wheel 14, when in the folded position, has a first height 46 measured in a direction transverse to the steering axis 16 (FIG. 2). The steering wheel 14, when in the steering position, has a second height 48 measured in the direction transverse to the steering axis 16 (FIG. 1). The height 46 is less than the height 48. Alternatively, the height 46 can be greater than or equal to the height 48. Once the steering wheel 14 has been moved to the folded position, the steering wheel can be moved toward and/or into the dashboard or support surface 15 through which the steering wheel extends to provide additional space for the vehicle occupant that would otherwise be unavailable.

FIGS. 3-30 depict example steering wheel assemblies configured to move a steering wheel between steering and folded positions. The example steering wheel assemblies are not necessarily exclusive of each other. Certain features can be shared and/or combined between the example steering wheel assemblies whether expressly stated, shown, or not. Common elements shared between the example steering wheel assemblies may be unnumbered in certain Figures or may have the same reference numbers with the addition of an associated alphabetical mark. Description of common elements may not be repeated for brevity. Further, the airbag module 18 has not been depicted in the example steering wheel assemblies of FIGS. 3-30 for clarity.

FIGS. 3-7 depict an example steering wheel assembly 10a. The steering wheel assembly 10a includes a support member 50a having a base portion 52a connectable to a steering column that extends through the dashboard or support surface 15. First and second support arms 54a, 56a extend from the base portion. The first and second support arms 54a, 56a extend generally parallel to each other and the steering axis 16a. First and second rim portions 26a, 28a of a steering wheel 14a have first ends 32a, 34a connected to the first support arm 54a by links 88a, 90a. Second ends 38a, 40a of the first and second rim portions 26a, 28a are connected to the second support arm 56a by other links 88a, 90a.

First and second central rim portions 30a, 36a of the steering wheel 14a can be connected to a carriage 58a. The carriage 58a includes a base portion 60a and first and second carriage arms 62a, 64a that extend from the base portion. The first and second carriage arms 62a, 64a extend generally parallel to each other and the steering axis 16a. The first carriage arm 62a has a first extension 61a connected thereto that extends generally parallel to the first carriage arm. The first extension 61a slides in a first guide channel 66a on the first support arm 54a. The second carriage arm 64a has a second extension 63a connected thereto that extends generally parallel to the second carriage arm. The second extension 63a slides in a second guide channel 68a on the second support arm 56a. The first and second guide channels 66a, 68a guide linear movement of the carriage 58a relative to the support member 50a.

Figure 3:
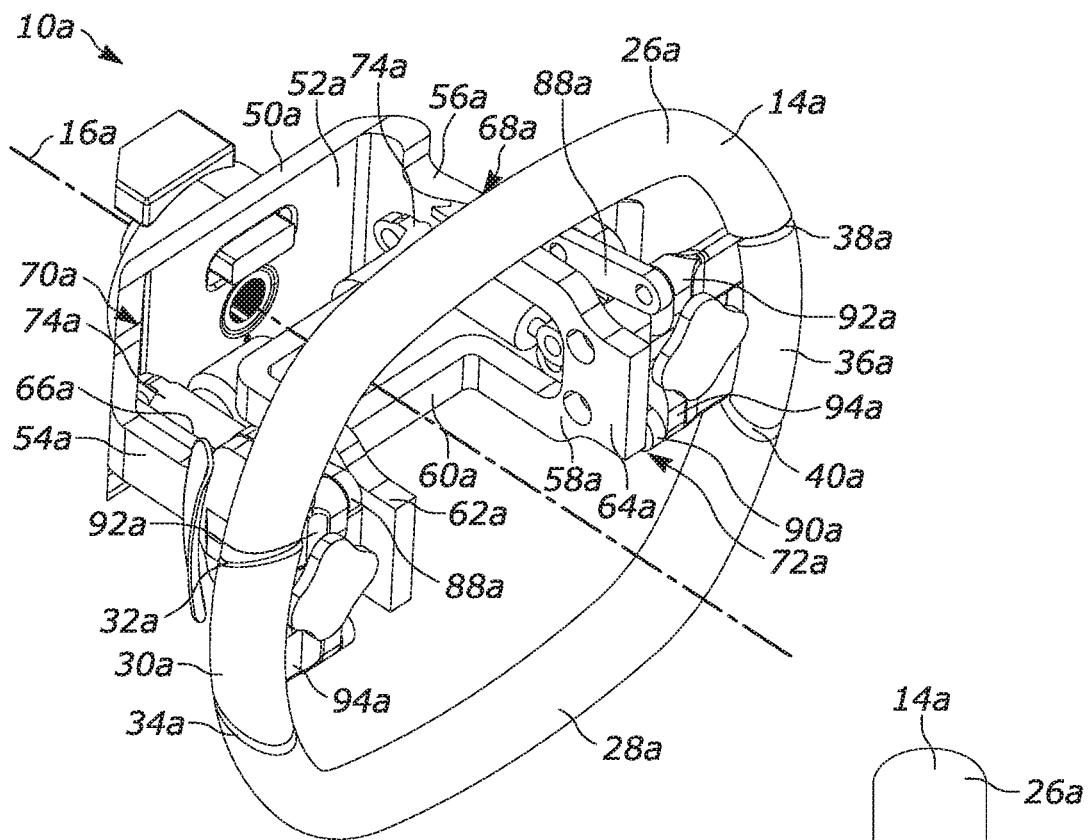
FIG. 3 is a partial perspective view of an example configuration of the steering wheel assembly of FIG. 1, including the steering wheel in the first position.
Figure 4:
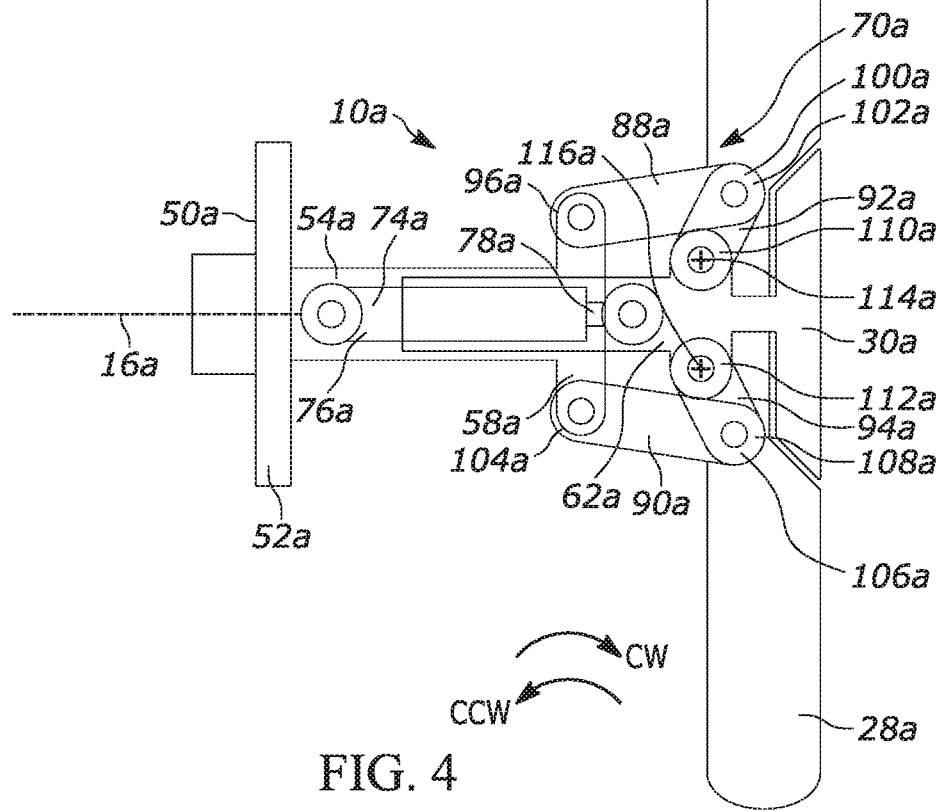
FIG. 4 is a schematic side view of the example configuration of the steering wheel assembly of FIG. 3, including the steering wheel in the first position.
Figure 5:
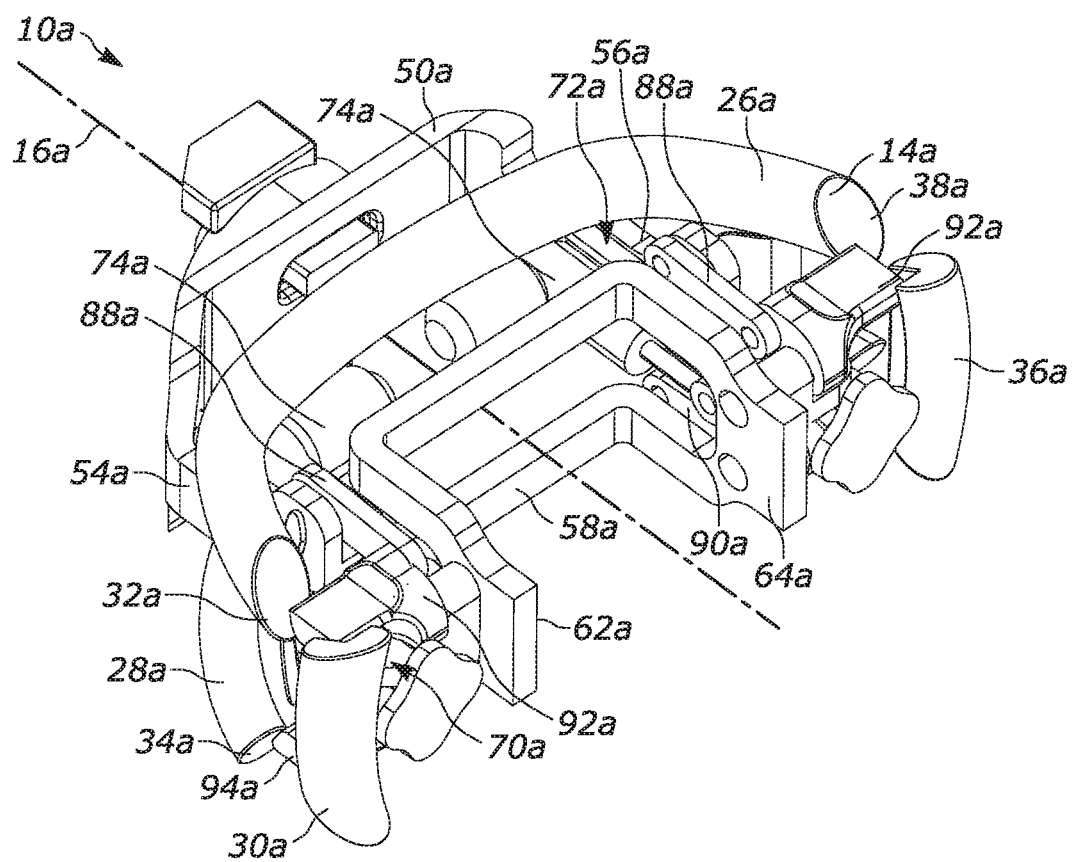
FIG. 5 is a partial perspective view of the example configuration of the steering wheel assembly of FIG. 3, including the steering wheel in the second position.
Figure 6:
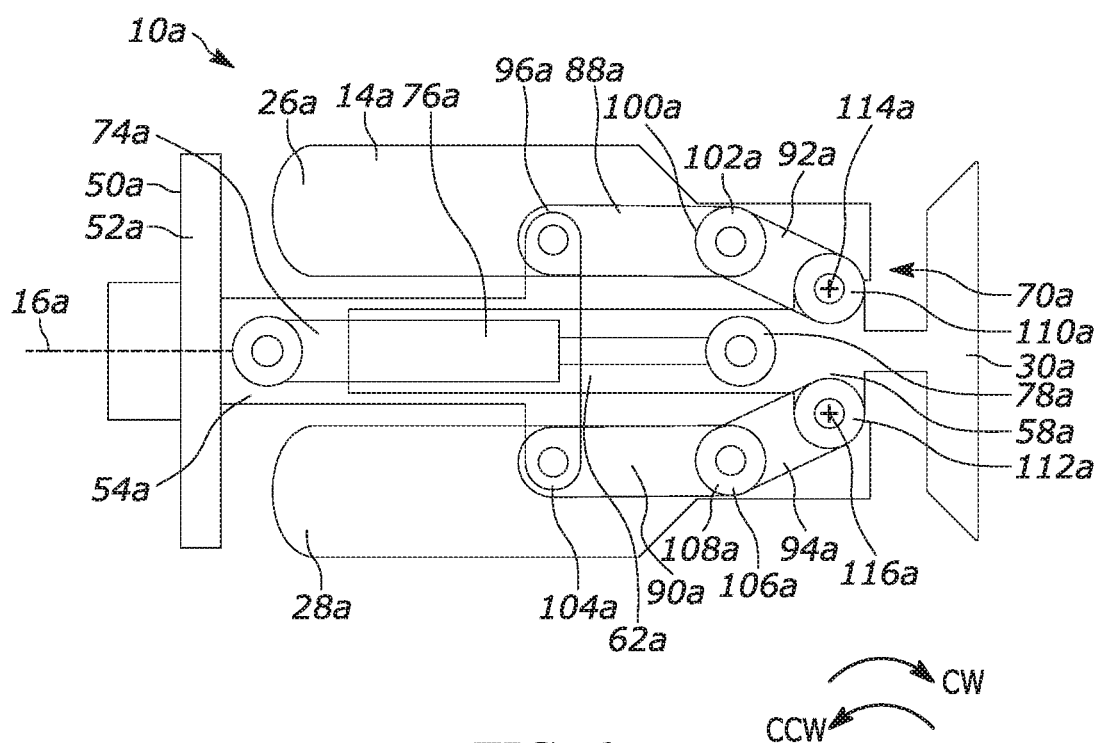
FIG. 6 is a schematic side view of the example configuration of the steering wheel assembly of FIG. 5, including the steering wheel in the second position.
Figure 7:
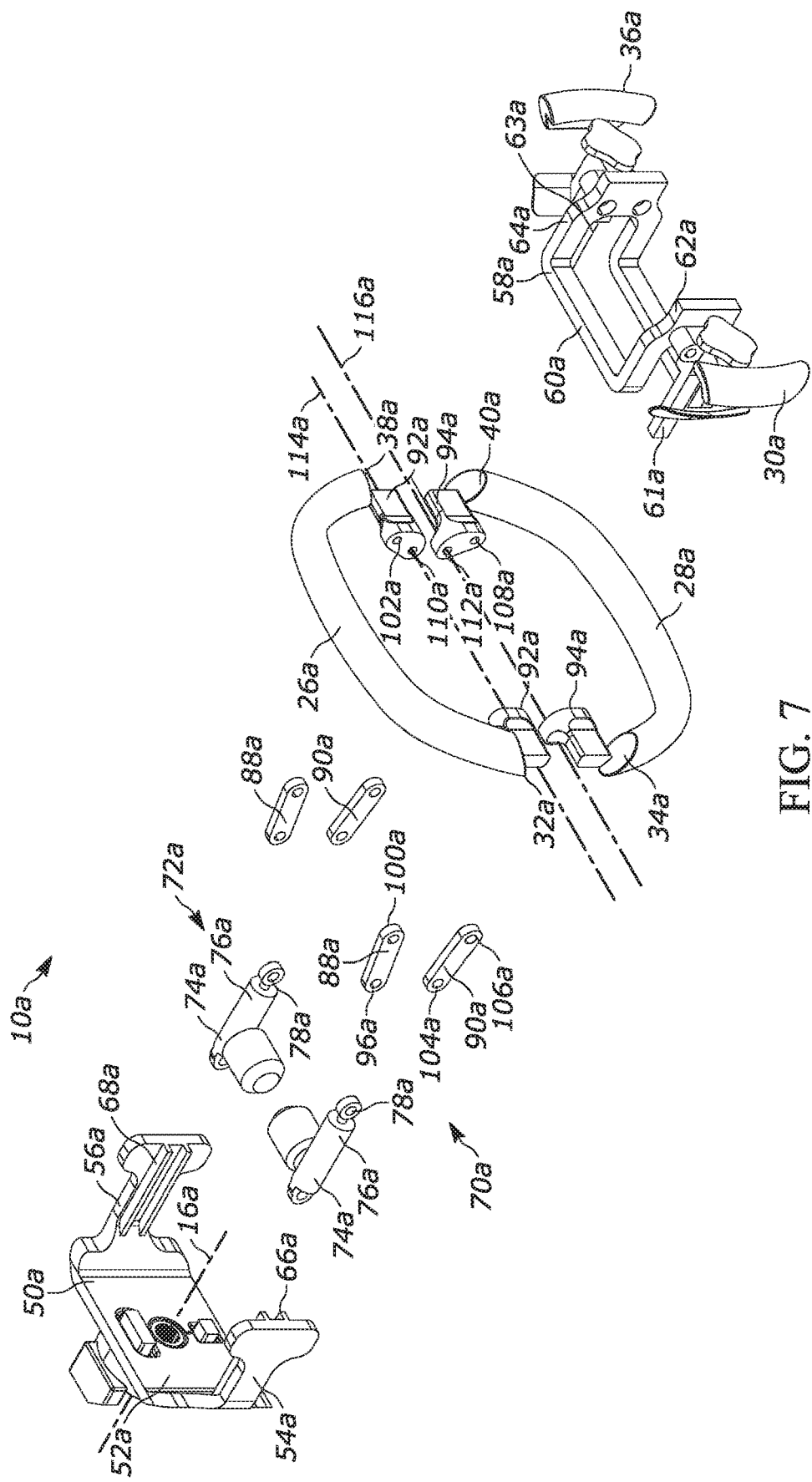
FIG. 7 is an exploded view of the steering wheel assembly of FIG. 3.

The steering wheel 14a can be moved between the steering and folded positions by switching portions 70a, 72a of the steering wheel assembly 10a. As shown in FIGS. 3 and 5, the steering wheel assembly 10a has a first switching portion 70a adjacent the first support arm 54a. A second switching portion 72a is adjacent the second support arm 56a. The first and second switching portions 70a, 72a mirror one another and operate in a similar manner. Thus, for the sake of brevity, only the first switching portion 70a will be described below.

As shown in FIGS. 3-7, the first switching portion 70a includes a linear actuator 74a having a mounting portion 76a and a driving portion 78a. The mounting portion 76a is connected to the first support arm 54a. The driving portion 78a is linearly movable within the mounting portion 76a relative to the mounting portion and to the support member 50a. The driving portion 78a is connected to the first carriage arm 62a. As shown in FIGS. 3-7, the driving and mounting portions 78a, 76a of the linear actuator 74a can be a piston rod and a cylinder, respectively. The linear actuator 74a can be electrically, hydraulically, and/or pneumatically powered. The linear actuator 74a can be electrically connected to a controller that actuates the linear actuator when the vehicle occupant desires and/or when certain vehicle conditions are met, such as when the vehicle 12 is parked.

A first end 96a of the first link 88a is pivotably connected to the first support arm 54a. A second end 100a of the first link 88a is pivotably connected to a first end 102a of a first pivot extension 92a. The first pivot extension 92a is on the first end 32a of the first rim portion 26a. The first pivot extension 92a can be formed as one piece with the first rim portion 26a.

A first end 104a of the second link 90a is pivotably connected to the first support arm 54a. A second end 106a of the second link 90a is pivotably connected to a first end 108a of a second pivot extension 94a. The second pivot extension 94a is on the first end 34a of the second rim portion 28a. The second pivot extension 94a can be formed as one piece with the second rim portion 28a. Second ends 110a, 112a of the first and second pivot extensions 92a, 94a are pivotably connected to the first carriage arm 62a.

As shown in FIGS. 3-6, with the steering wheel 14a in the steering position, actuation of the linear actuator 74a causes the first and second rim portions 26a, 28a to pivot relative to the support member 50a from the steering position to the folded position. Upon actuation of the linear actuator 74a, the driving portion 78a linearly moves relative to the mounting portion 76a away from the base portion 52a of the support member 50a. The driving portion 78a linearly moves the carriage 58a away from the base portion 52a relative to the support member 50a. The linearly moving carriage 58a causes the first pivot extension 92a to pivot in a counterclockwise direction CCW relative to the second end 100a of the first link 88a. The linearly moving carriage 58a also causes the second pivot extension 94a to pivot in a clockwise direction CW relative to the second end 106a of the second link 90a.

As the first pivot extension 92a pivots relative to the first link 88a, the first rim portion 26a pivots in the counterclockwise direction CCW relative to the carriage 58a from the steering position to the folded position. The first rim portion 26a pivots about a first pivot axis 114a relative to the carriage 58a. As the second pivot extension 94a pivots relative to the second link 90a, the second rim portion 28a pivots in the clockwise direction CW relative to the carriage 58a from the steering position to the folded position. The second rim portion 28a pivots about a second pivot axis 116a relative to the carriage 58a. The first and second pivot axes 114a, 116a extend generally parallel to each other and transverse to the steering axis 16a.

The linear actuator 74a can be actuated to reverse the above described process and cause the first and second rim portions 26a, 28a to pivot about the first and second pivot axes 114a, 116a, respectively, relative to the carriage 58a from the folded position to the steering position.

Although not shown in FIGS. 3-7, the housing 20, the airbag 22 and/or the inflator 24 can be connected to the carriage 58a so that linear motion of the carriage moves the housing, the airbag and/or the inflator relative to the support member 50a.

FIGS. 8-12 depict another example steering wheel assembly 10b. The support member 50b of the steering wheel assembly 10b is substantially similar to the support member 50a of steering wheel assembly 10a. However, the support member 50b includes a central portion 118b that extends between the first and second support arms 54b, 56b. Portions of the airbag module 18 may fixedly connected to the central portion 118b of the support member 50b. Further, the support member 50b does not include first and second guide channels 66a, 66b.

Pivot extensions 92b, 94b on first ends 32b, 34b of first and second rim portions 26b, 28b of a steering wheel 14b are pivotably connected to the first support arm 54b. Pivot extensions 92b, 94b on second ends 38b, 40b of the first and second rim portions 26b, 28b are pivotably connected to the second support arm 56b. A first central rim portion 30a is connected to the first support arm 54b. A second central rim portion 36b is connected to the second support arm 56b.

Figure 8:
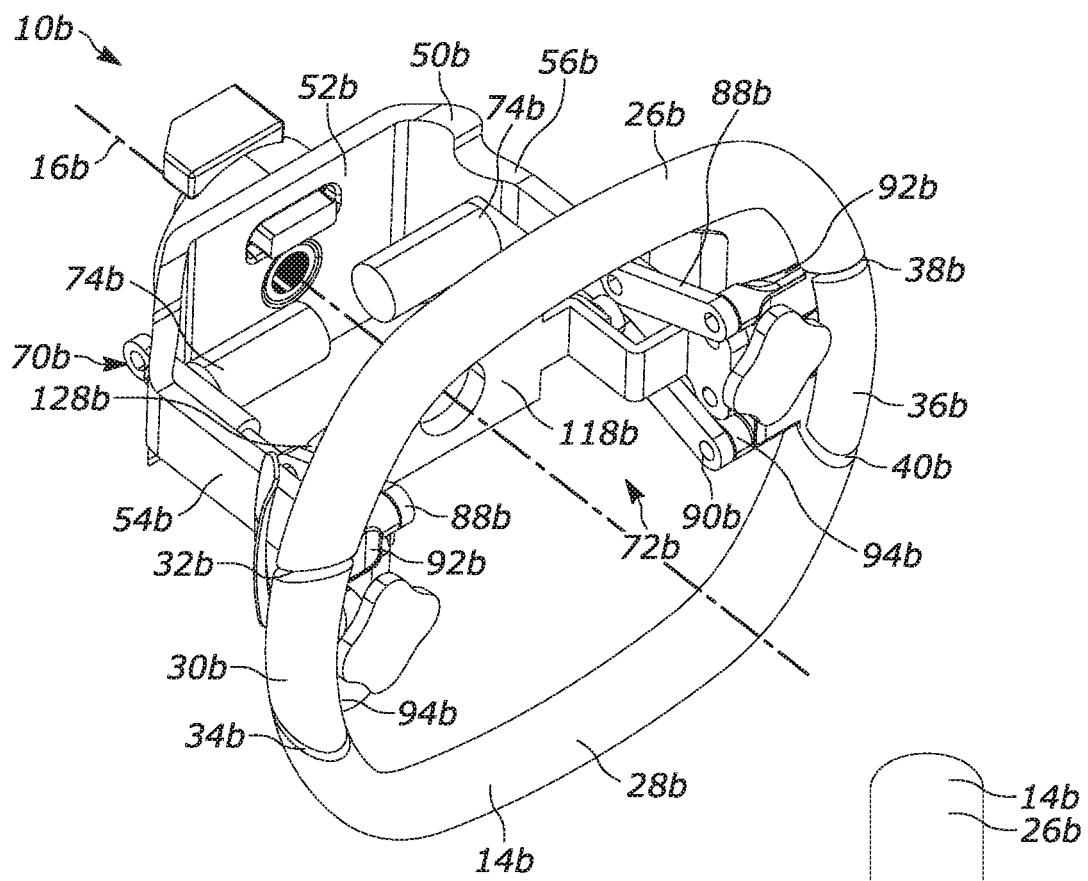
FIG. 8 is a partial perspective view of an example configuration of the steering wheel assembly of FIG. 1, including the steering wheel in the first position.
Figure 9:
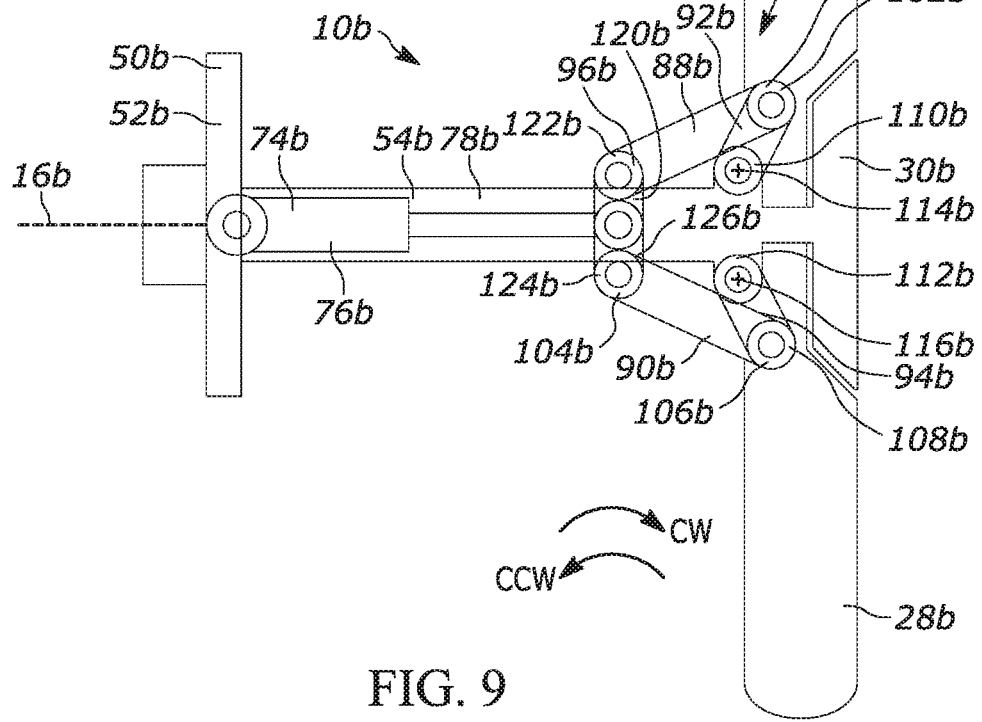
FIG. 9 is a schematic side view of the example configuration of the steering wheel assembly of FIG. 8, including the steering wheel in the first position.
Figure 10:
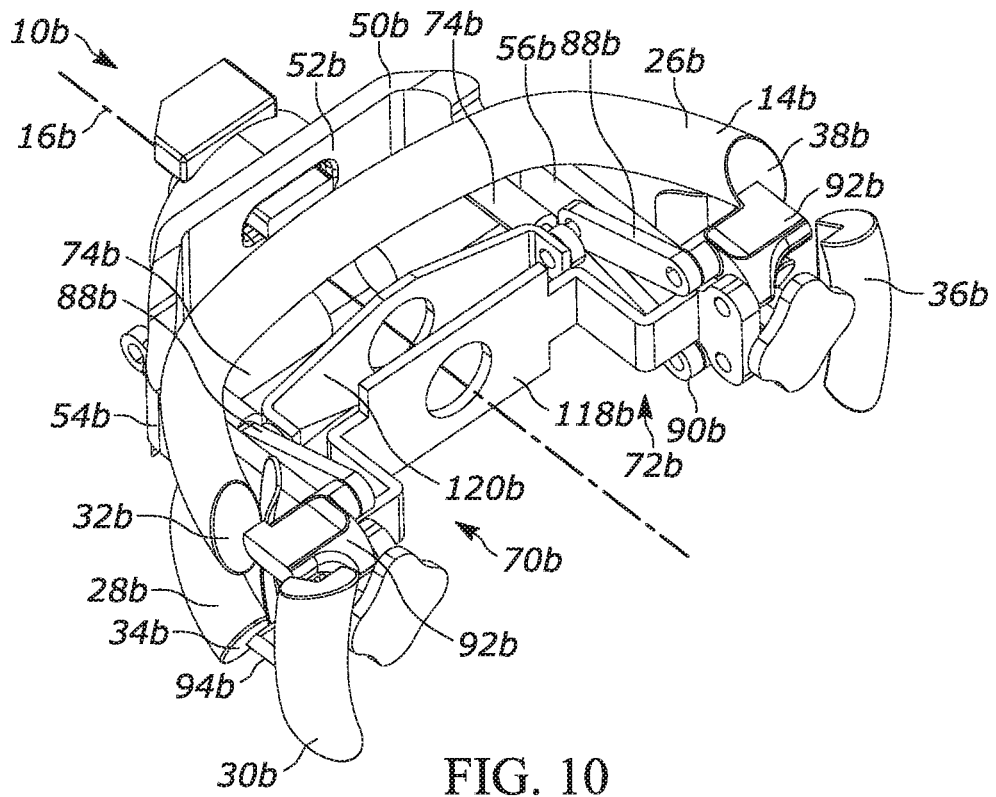
FIG. 10 is a partial perspective view of the example configuration of the steering wheel assembly of FIG. 8, including the steering wheel in the second position.
Figure 11:
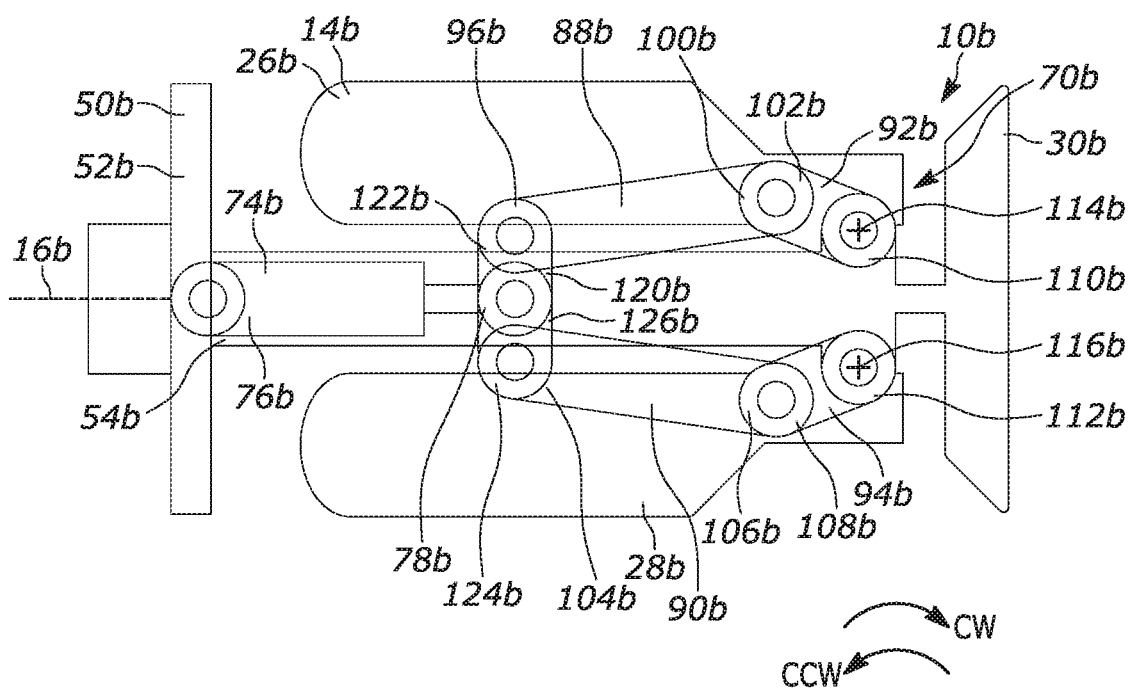
FIG. 11 is a schematic side view of the example configuration of the steering wheel assembly of FIG. 10, including the steering wheel in the second position.
Figure 12:
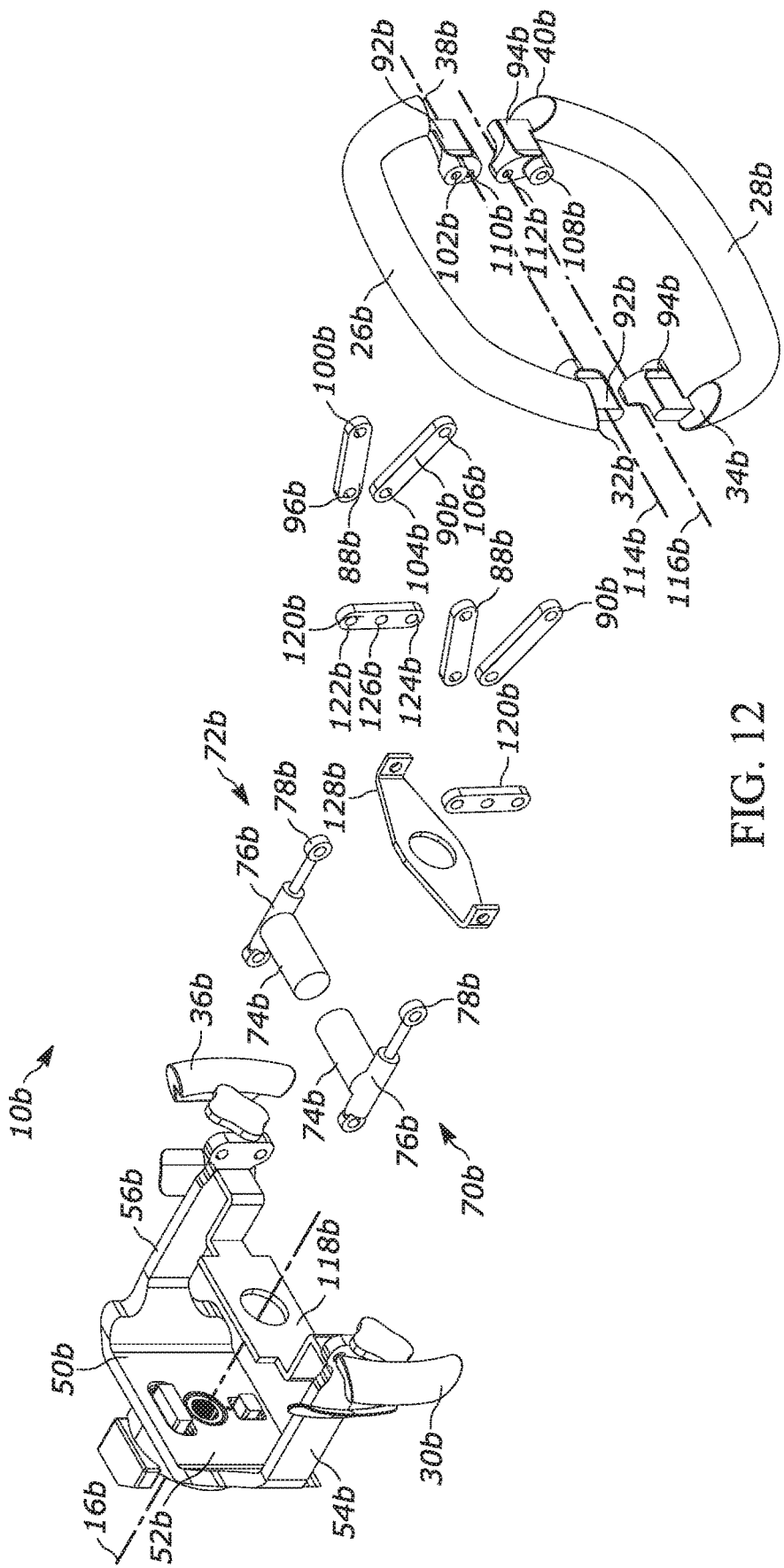
FIG. 12 is an exploded view of the steering wheel assembly of FIG. 8.

The steering wheel 14b can be moved between the steering and folded positions by switching portions 70b, 72b of the steering wheel assembly 10b. As shown in FIGS. 8 and 10, the steering wheel assembly 10b has a first switching portion 70b adjacent the first support arm 54b and a second switching portion 72b adjacent the second support arm 56b. The first and second switching portions 70b, 72b mirror one another and operate in a similar manner. Thus, for the sake of brevity, only the first switching portion 70b will be described below.

As shown in FIGS. 8-12, the first switching portion 70b includes a linear actuator 74b having a mounting portion 76b and a driving portion 78b. The mounting portion 76b is connected to the support member 50b. The driving portion 78b is operably connected to the first and second rim portions 26b, 28b.

A first end 96b of a first link 88b is pivotably connected to a first end 122b of a connecting link 120b. A second end 100b of the first link 88b is pivotably connected to a first end 102b of the first pivot extension 92b. A first end 104b of a second link 90b is pivotably connected to a second end 124b of the connecting link 120b. A second end 106b of the second link 90b is pivotably connected to a first end 108b of the second pivot extension 94b. Second ends 110b, 112b of the first and second pivot extensions 92b, 94b are pivotably connected to the first support arm 54b. The connecting link 120b has a central portion 126b that is connected to the linear actuator 74b. Alternatively, the connecting link 120b can be omitted and the first ends 96b, 104b of the first and second links 88b, 90b can be connected directly to the driving portion 78b of the linear actuator 74b.

The steering wheel assembly 10b can also include a switching portion connector 128b that extends between and interconnects the driving portions 78b of the linear actuators 74b. The switching portion connector 128b is linearly movable by the linear actuators 74b relative to the support member 50b. The switching portion connector 128b helps ensure that the driving portions 78b of the linear actuators 74b move together when actuated.

As shown in FIGS. 8-11, with the steering wheel 14b in the steering position, actuation of the linear actuator 74b causes the first and second rim portions 26b, 28b to pivot relative to the support member 50b from the steering position to the folded position. Upon actuation of the linear actuator 74b, the driving portion 78b linearly moves relative to the mounting portion 76b toward the base portion 52b of the support member 50b. The driving portion 78b linearly moves the switching portion connector 128b and the connecting link 120b toward the base portion 52b relative to the support member 50b. The first and second links 88b, 90b move toward the base portion 52b with the connecting link 120b when the linear actuator 74b is actuated. The first pivot extension 92b pivots in the counterclockwise direction CCW relative to the support member 50b. The second pivot extension 94b pivots in the clockwise direction CW relative to the support member 50b.

As the first pivot extension 92b pivots relative to the support member 50b, the first rim portion 26b pivots in the counterclockwise direction CCW relative to the support member 50b from the steering position to the folded position. The first rim portion 26b pivots about a first pivot axis 114b relative to the support member 50b. As the second pivot extension 94b pivots relative to the support member 50b, the second rim portion 28b pivots in the clockwise direction CW relative to the support member 50b from the steering position to the folded position. The second rim portion 28b pivots about a second pivot axis 116b relative to the support member 50b. The first and second pivot axes 114b, 116b extend generally parallel to each other and transverse to the steering axis 16b.

The linear actuator 74b can be actuated to reverse the above described process and cause the first and second rim portions 26b, 28b to pivot about the first and second pivot axes 114b, 116b, respectively, relative to the support member 50b from the folded position to the steering position.

FIGS. 13-17 depict another example steering wheel assembly 10c. The support member 50c of the steering wheel assembly 10c is substantially similar to the support member 50b of steering wheel assembly 10b. However, the central portion 118c extends from the base portion 52c of the support member 50c instead of between the first and second support arms 54c, 56c. Portions of the airbag module 10 may fixedly connected to the central portion 118c of the support member 50c.

Pivot extensions 92c, 94c on first ends 32c, 34c of the first and second rim portions 26c, 28c of a steering wheel 14c are pivotably connected to the first support arm 54c. Pivot extensions 92c, 94c on second ends 38c, 40c of the first and second rim portions 26c, 28c are pivotably connected to the second support arm 56c. A first central rim portion 30c is connected to the first support arm 54c. A second central rim portion 36c is connected to the second support arm 56c.

Figure 13:
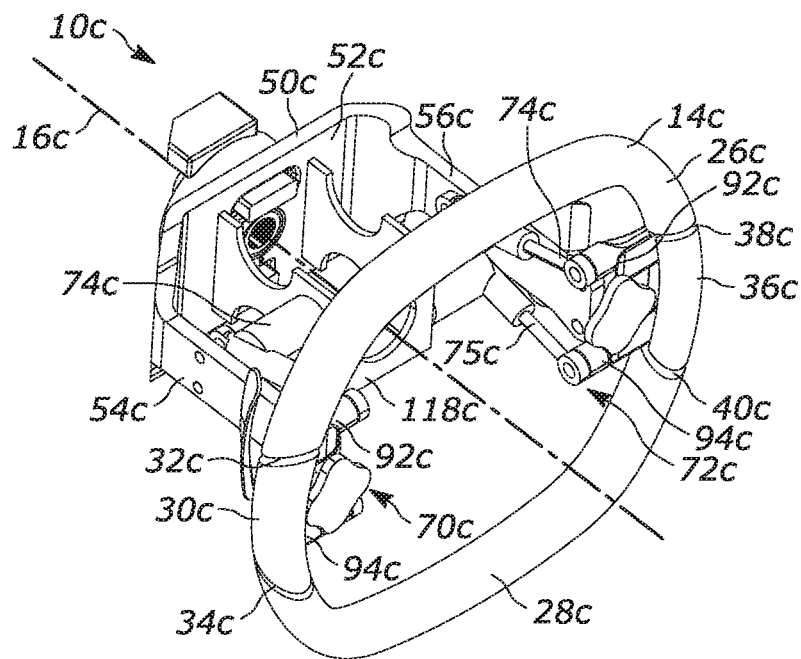
FIG. 13 is a partial perspective view of an example configuration of the steering wheel assembly of FIG. 1, including the steering wheel in the first position.
Figure 14:
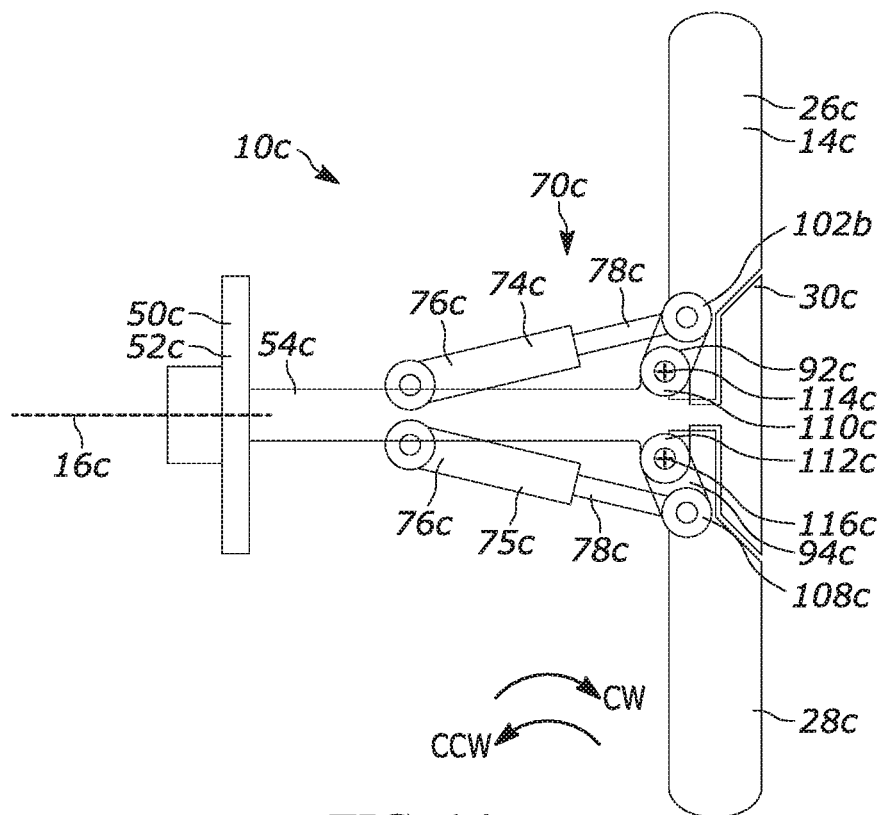
FIG. 14 is a schematic side view of the example configuration of the steering wheel assembly of FIG. 13, including the steering wheel in the first position.
Figure 15:
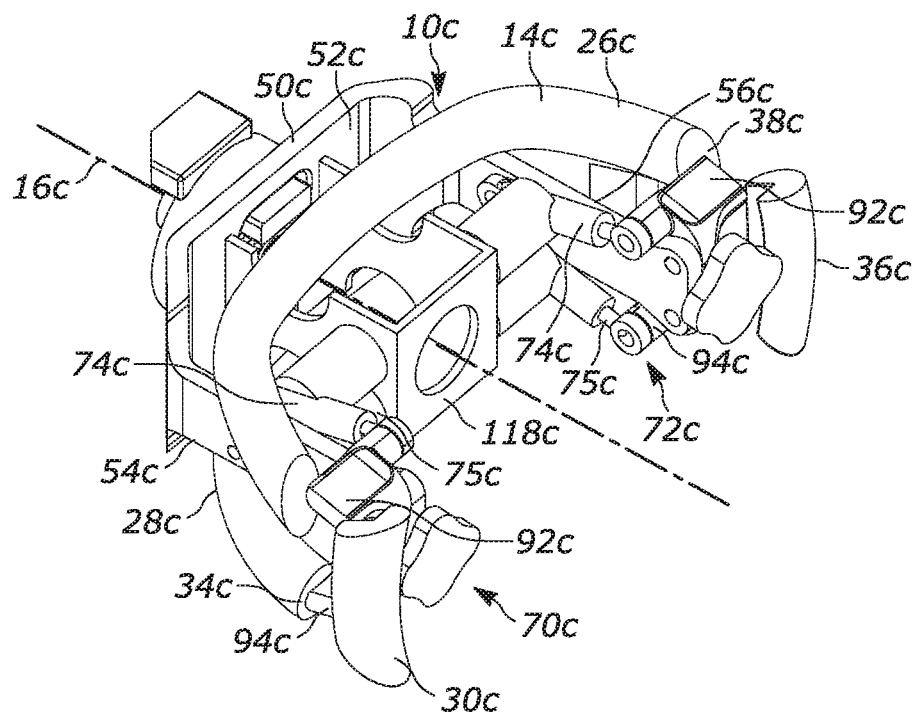
FIG. 15 is a partial perspective view of the example configuration of the steering wheel assembly of FIG. 13, including the steering wheel in the second position.
Figure 16:
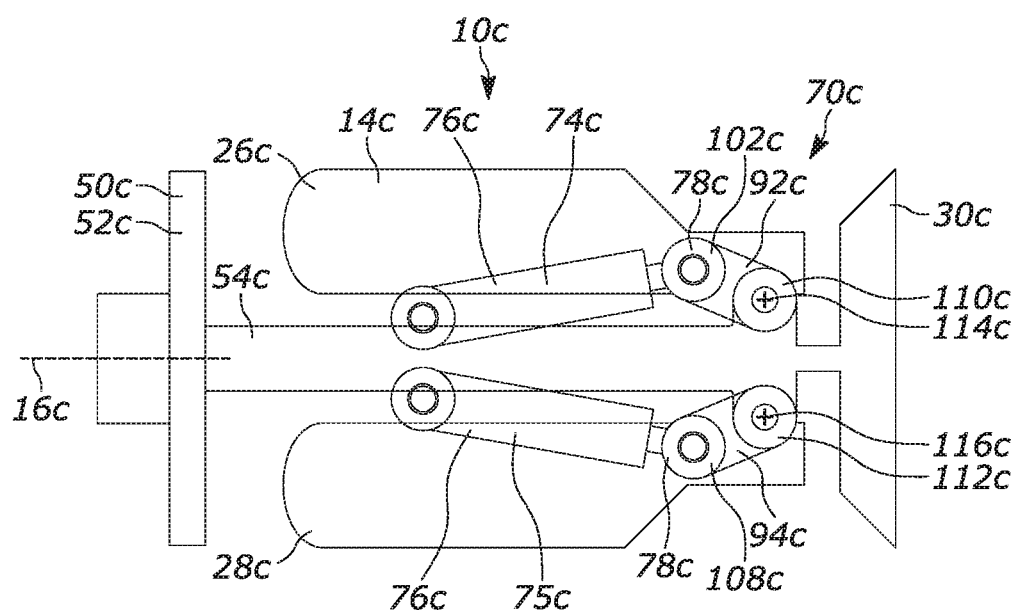
FIG. 16 is a schematic side view of the example configuration of the steering wheel assembly of FIG. 15, including the steering wheel in the second position.
Figure 17:
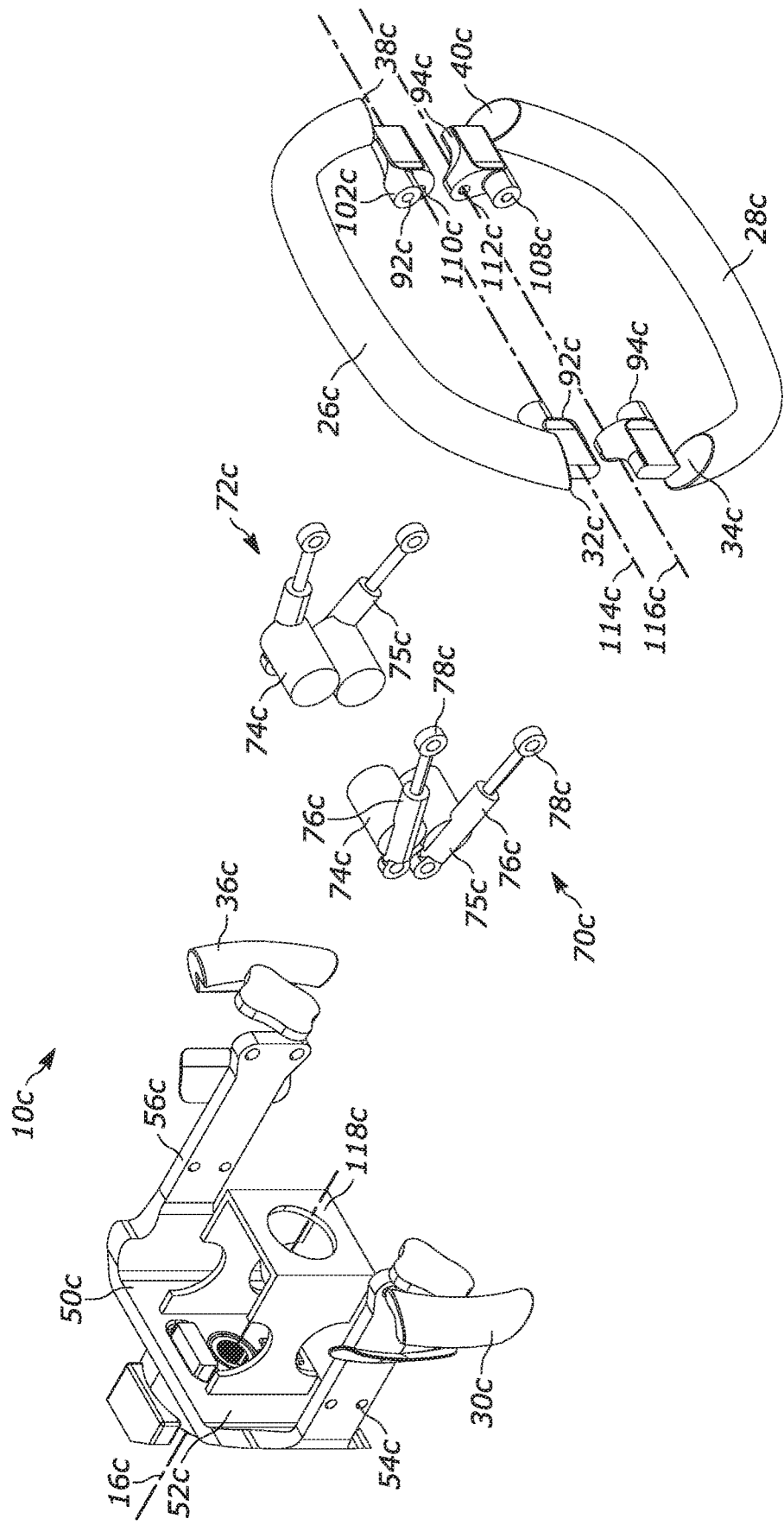
FIG. 17 is an exploded view of the steering wheel assembly of FIG. 13.
Figure 18:
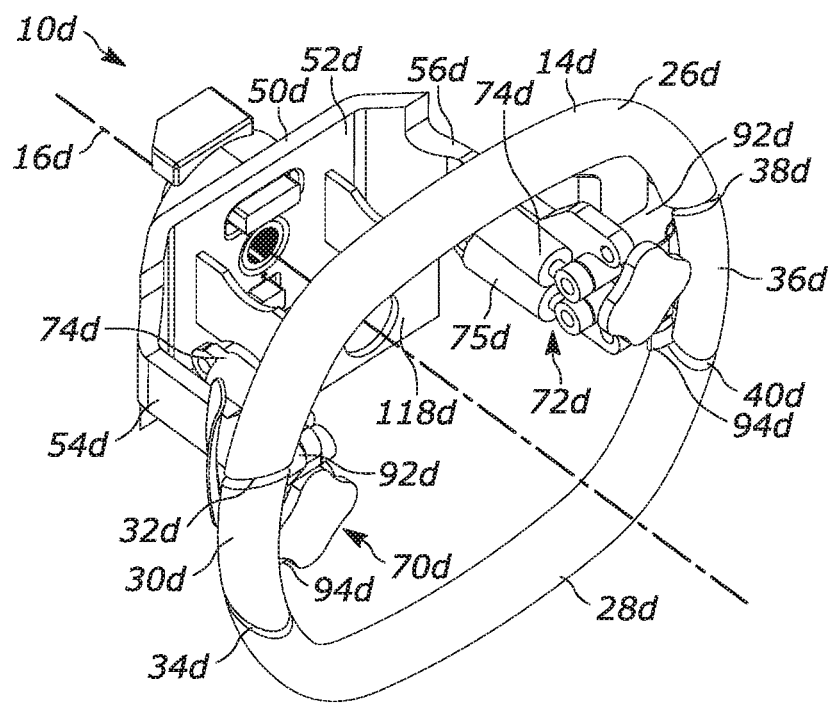
FIG. 18 is a partial perspective view of an example configuration of the steering wheel assembly of FIG. 1, including the steering wheel in the first position.
Figure 19:
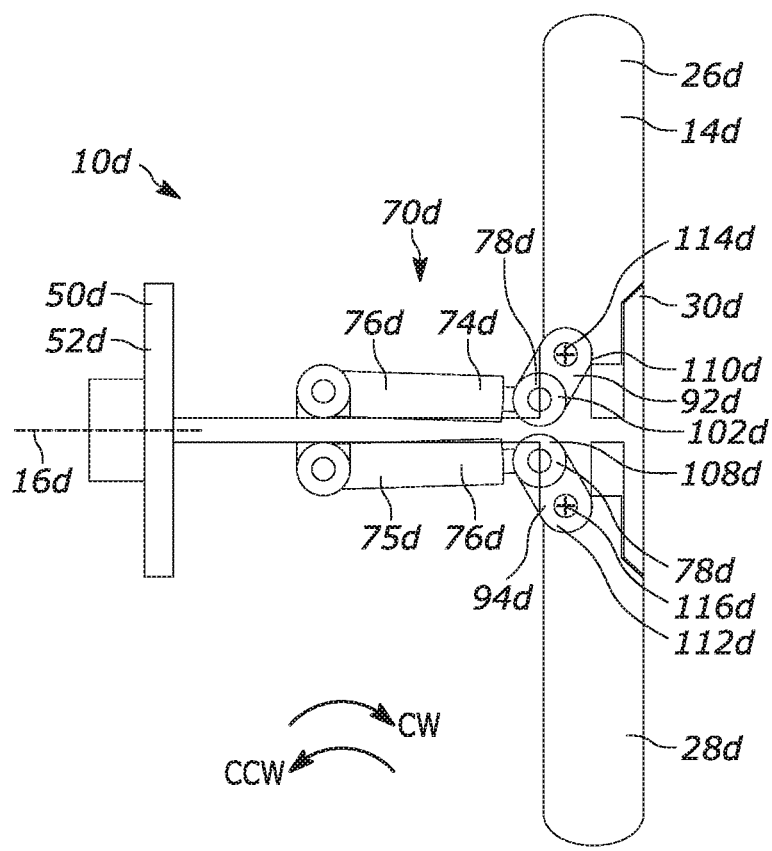
FIG. 19 is a schematic side view of the example configuration of the steering wheel assembly of FIG. 18, including the steering wheel in the first position.
Figure 20:
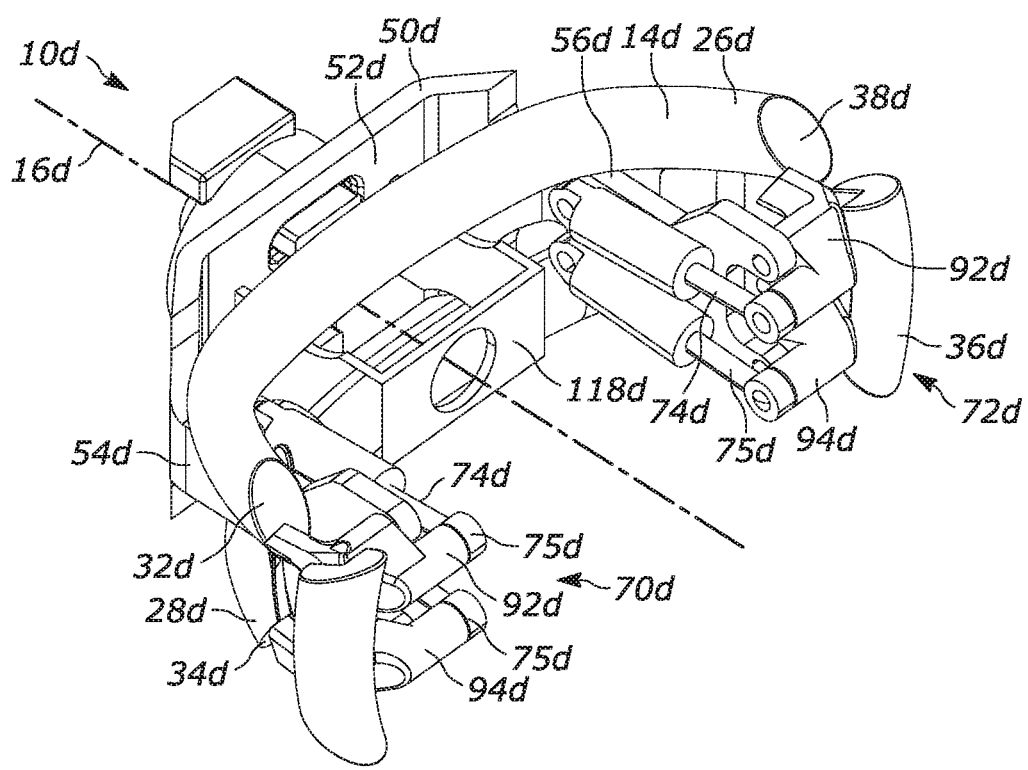
FIG. 20 is a partial perspective view of the example configuration of the steering wheel assembly of FIG. 18, including the steering wheel in the second position.
Figure 21:
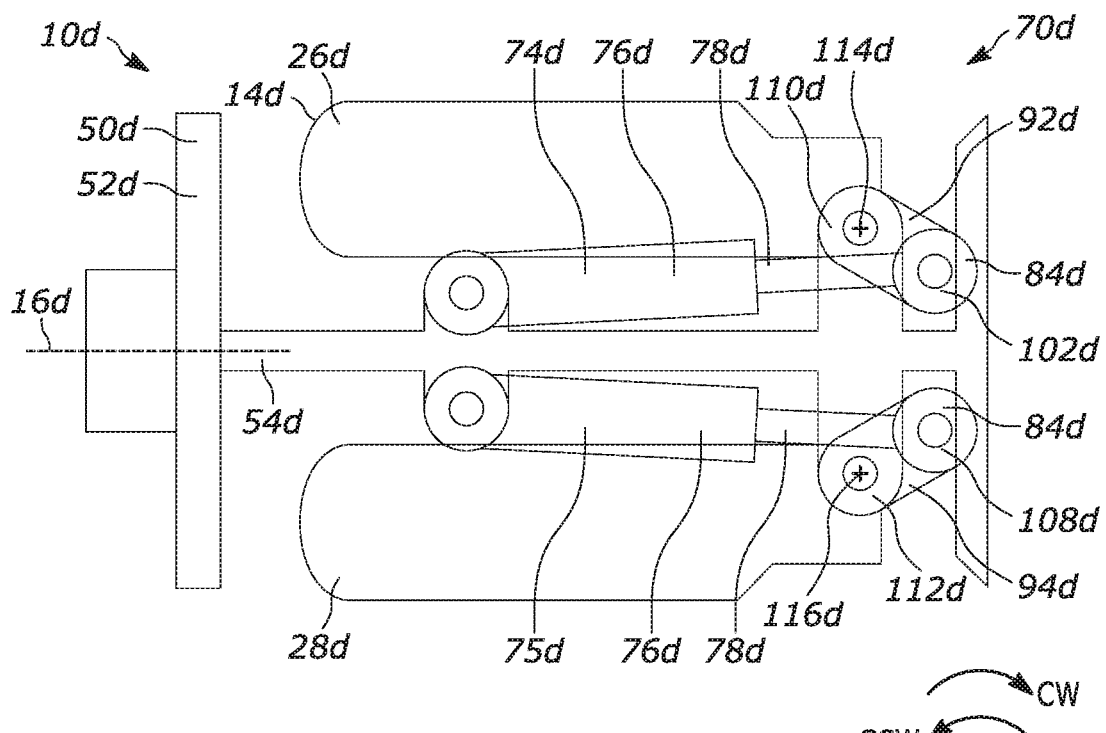
FIG. 21 is a schematic side view of the example configuration of the steering wheel assembly of FIG. 20, including the steering wheel in the second position.
Figure 22:
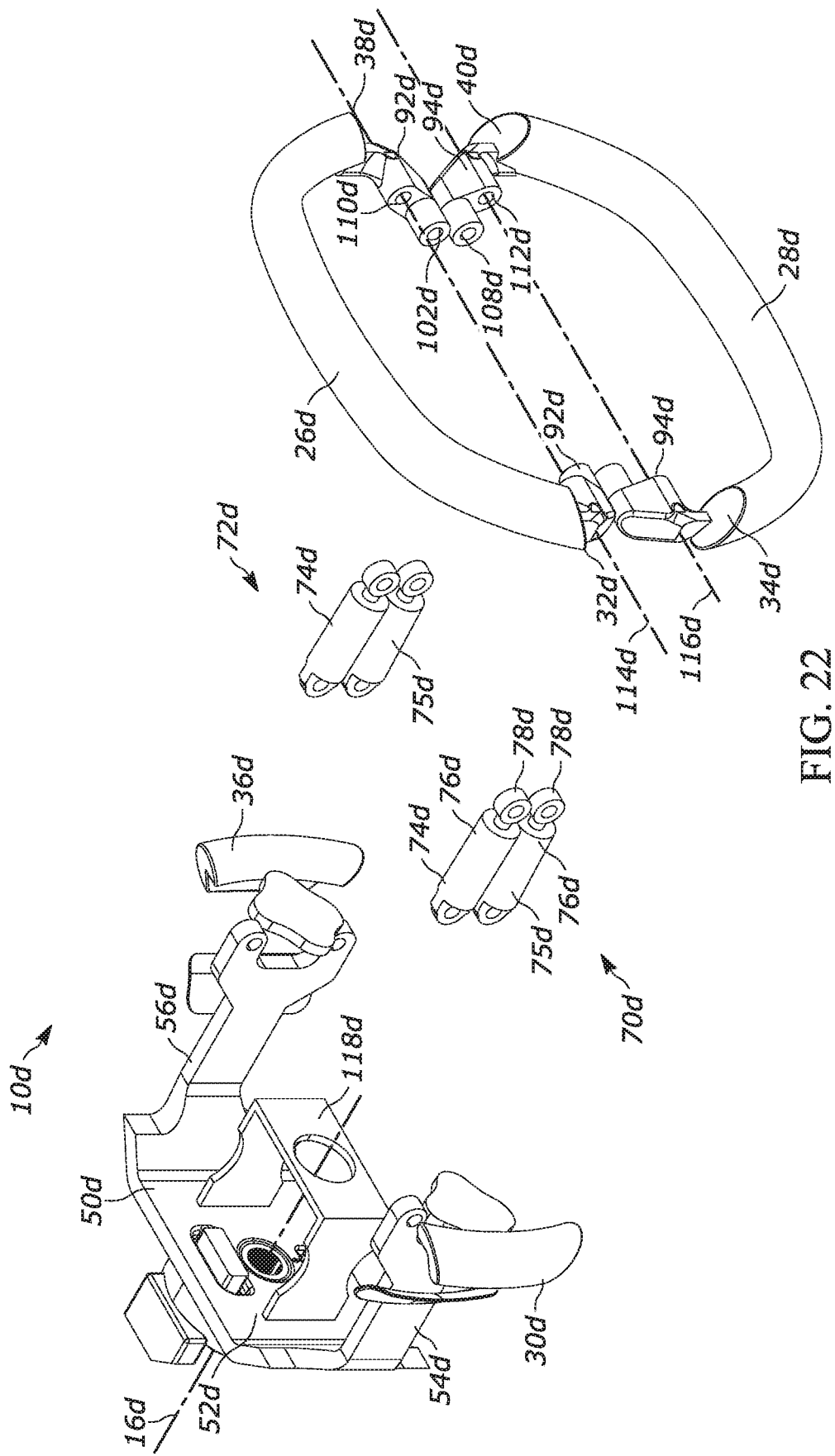
FIG. 22 is an exploded view of the steering wheel assembly of FIG. 18.

The steering wheel 14c can be moved between the steering and folded positions by switching portions 70c, 72c of the steering wheel assembly 10c. As shown in FIGS. 13 and 15, the steering wheel assembly 10c has a first switching portion 70c adjacent the first support arm 54c and a second switching portion 72c adjacent the second support arm 56c. The first and second switching portions 70c, 72c mirror one another and operate in a similar manner. Thus, for the sake of brevity, only the first switching portion 70c will be described below.

As shown in FIGS. 13-17, the first switching portion 70c includes first and second linear actuators 74c, 75c each having a mounting portion 76c and a driving portion 78c. Each mounting portion 76c of the first and second linear actuators 74c, 75c is connected to the first support arm 54c. The driving portion 78c of the first linear actuator 74c is operably connected to the first end 32c of the first rim portion 26c. The driving portion 78c of the second linear actuator 75c is operably connected to the first end 34c of the second rim portion 28c. The first and second linear actuators 74c, 75c can be electrically connected to a controller that actuates the first and second linear actuators. The controller can actuate the first and second linear actuators 74c, 75c so that the driving portions 78c of the first and second linear actuators linearly move simultaneously or consecutively.

A first end 102c of the first pivot extension 92c is pivotably connected to the driving portion 78c of the first linear actuator 74c. A second end 110c of the first pivot extension 92c is pivotably connected to the first support arm 54c. A first end 108c of the second pivot extension 94c is pivotably connected to driving portion 78c of the second linear actuator 75c. A second end 112c of the second pivot extension 94c is pivotably connected to the first support arm 54c.

As shown in FIGS. 13-16, with the steering wheel 14c in the steering position, actuation of the first and second linear actuators 74c, 75c causes the first and second rim portions 26c, 28c to pivot relative to the support member 50c from the steering position to the folded position. Upon actuation of the first and second linear actuators 74c, 75c, the driving portions 78c linearly move relative to the mounting portions 76c toward the base portion 52c of the support member 50c. The linearly moving driving portion 78c of the first linear actuator 74c pivots the first pivot extension 92c in the counterclockwise direction CCW relative to the support member 50c. The linearly moving driving portion 78c of the second linear actuator 75c pivots the second pivot extension 94c in the clockwise direction CW relative to the support member 50c.

As the first pivot extension 92c pivots relative to the support member 50c, the first rim portion 26c pivots in the counterclockwise direction CCW relative to the support member 50c from the steering position to the folded position. The first rim portion 26c pivots about a first pivot axis 114c relative to the support member 50c. As the second pivot extension 94c pivots relative to the support member 50c, the second rim portion 28c pivots in the clockwise direction CW relative to the support member 50c from the steering position to the folded position. The second rim portion 28c pivots about a second pivot axis 116c relative to the support member 50c. The first and second pivot axes 114c, 116c extend generally parallel to each other and transverse to the steering axis 16c.

The first and second linear actuators 74c, 75c can be actuated to reverse the above described process and cause the first and second rim portions 26c, 28c to pivot about the first and second pivot axes 114c, 116c, respectively, relative to the support member 50c from the folded position to the steering position.

FIGS. 18-22 depict another example steering wheel assembly 10d. The steering wheel assembly 10d has a similar structure to the structure of the steering wheel assembly 10c. When the steering wheel 14d is in the steering position, actuation of the first and second linear actuators 74d, 75d causes the first and second rim portions 26d, 28d to pivot relative to the support member 50d from the steering position to the folded position. Upon actuation of the first and second linear actuators 74d, 75d, the driving portions 78d linearly move relative to the mounting portions 76d away from the base portion 52d of the support member 50d. The linearly moving driving portion 78d of the first linear actuator 74d pivots the first pivot extension 92d in the counterclockwise direction CCW relative to the support member 50d. The linearly moving driving portion 78d of the second linear actuator 75d pivots the second pivot extension 94d in the clockwise direction CW relative to the support member 50d.

As the first pivot extension 92d pivots relative to the support member 50d, the first rim portion 26d pivots in the counterclockwise direction CCW relative to the support member 50d from the steering position to the folded position. The first rim portion 26d pivots about a first pivot axis 114d relative to the support member 50d. As the second pivot extension 94d pivots relative to the support member 50d, the second rim portion 28d pivots in the clockwise direction CW relative to the support member 50d from the steering position to the folded position. The second rim portion 28d pivots about a second pivot axis 116d relative to the support member 50d. The first and second pivot axes 114d, 116d extend generally parallel to each other and transverse to the steering axis 16d.

The first and second linear actuators 74d, 75d can be actuated to reverse the above described process and cause the first and second rim portions 26d, 28d to pivot about the first and second pivot axes 114d, 116d, respectively, relative to the support member 50d from the folded position to the steering position.

FIGS. 23-27 depict another example steering wheel assembly 10e. The support member 50e of the steering wheel assembly 10e is substantially similar to the support member 50c of steering wheel assembly 10c. Pivot extensions 92e, 94e on first ends 32e, 34e of the first and second rim portions 26e, 28e of a steering wheel 14e are pivotably connected to the first support arm 54e. Pivot extensions 92e, 94e on second ends 38e, 40e of the first and second rim portions 26e, 28e are pivotably connected to the second support arm 56e. A first central rim portion 30e is connected to the first support arm 54e. A second central rim portion 36e is connected to the second support arm 56e.

Figure 23:
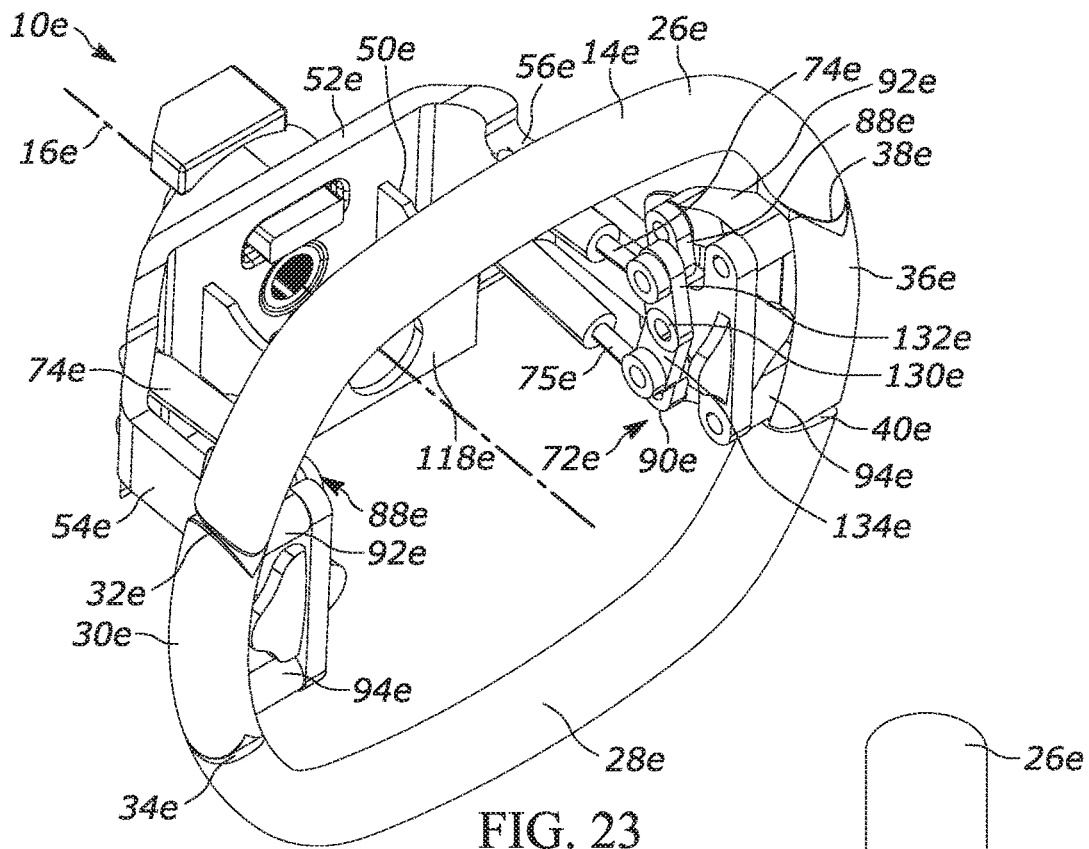
FIG. 23 is a partial perspective view of an example configuration of the steering wheel assembly of FIG. 1, including the steering wheel in the first position.
Figure 24:
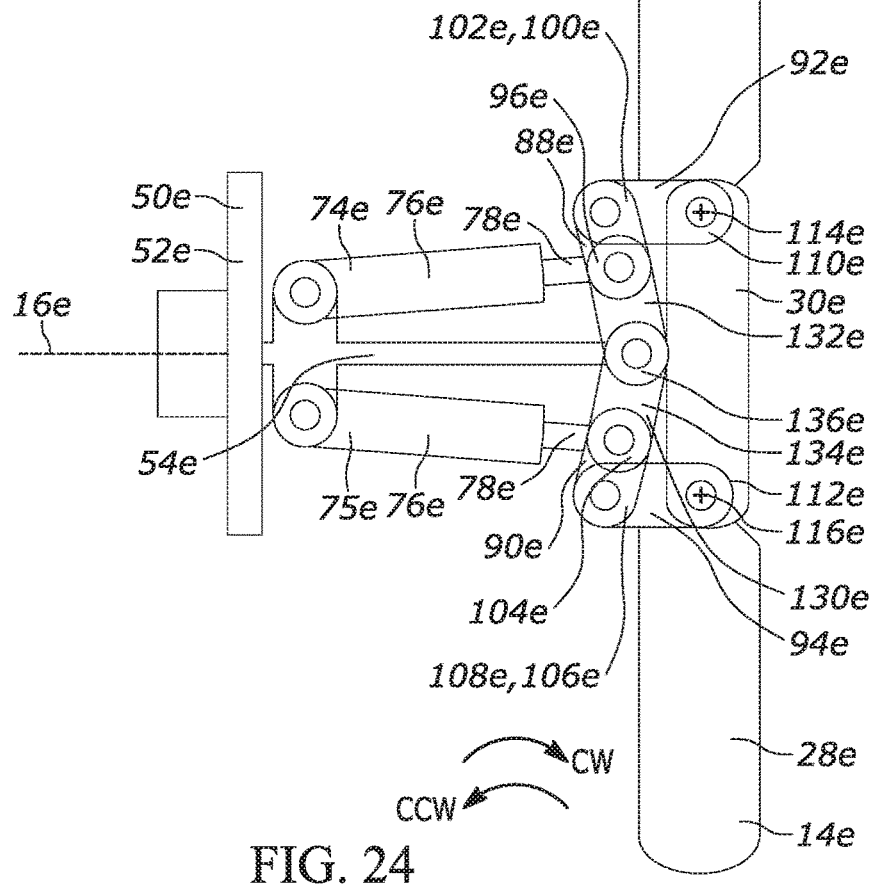
FIG. 24 is a schematic side view of the example configuration of the steering wheel assembly of FIG. 23, including the steering wheel in the first position.
Figure 25:
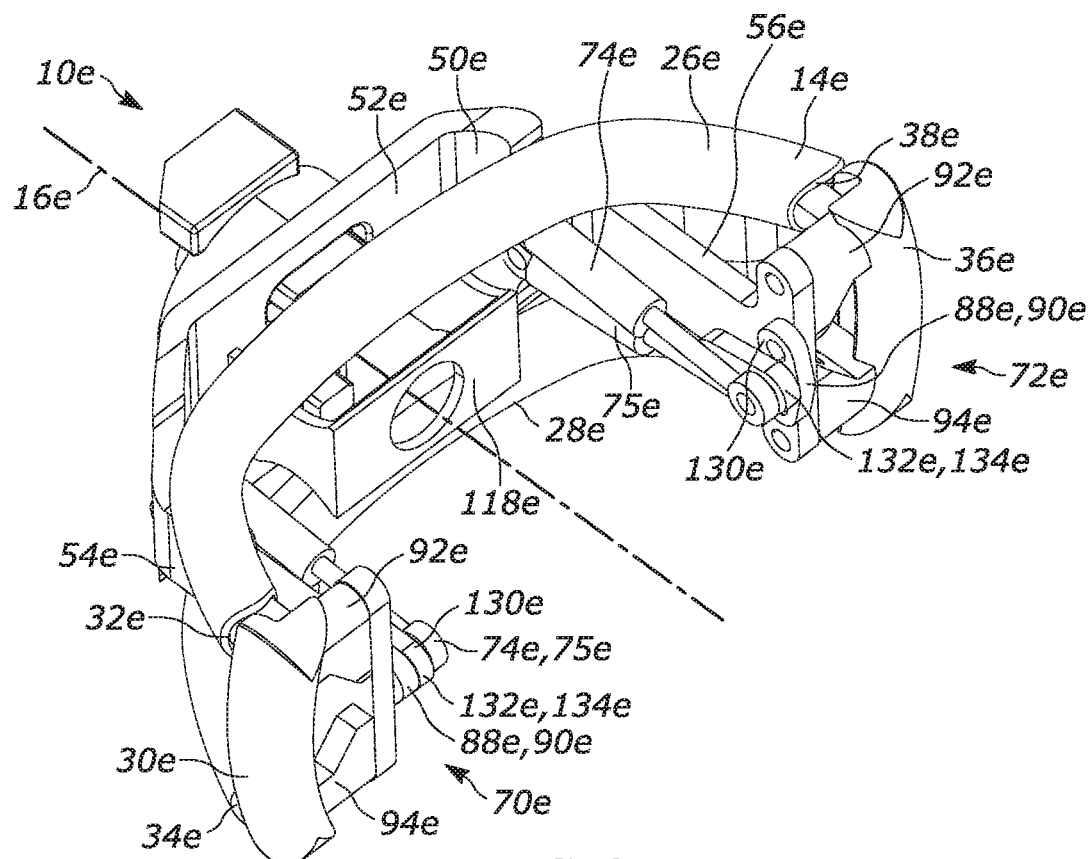
FIG. 25 is a partial perspective view of the example configuration of the steering wheel assembly of FIG. 23, including the steering wheel in the second position.

The steering wheel 14e can be moved between the steering and folded positions by switching portions 70e, 72e of the steering wheel assembly 10e. As shown in FIGS. 23 and 25, the steering wheel assembly 10e has a first switching portion 70e adjacent the first support arm 54e and a second switching portion 72e adjacent the second support arm 56e. The first and second switching portions 70e, 72e mirror one another and operate in a similar manner. Thus, for the sake of brevity, only the first switching portion 70e will be described below.

As shown in FIGS. 23-27, the first switching portion 70e includes first and second linear actuators 74e, 75e each having a mounting portion 76e and a driving portion 78e. Each mounting portion 76e of the first and second linear actuators 74e, 75e is pivotably connected to the first support arm 54e. The driving portion 78e of the first linear actuator 74e is operably connected to the first end 32e of the first rim portion 26e. The driving portion 78e of the second linear actuator 75e is operably connected to the first end 34e of the second rim portion 28e.

The first switching portion 70e further includes a pivot mechanism 130e. The pivot mechanism 130e has first and second pivot arms 132e, 134e that are pivotable relative to a central portion 136e of the pivot mechanism. The central portion 136e of the pivot mechanism 130e is fixedly connected to the support member 50e so that the first and second pivot arms 132e, 134e are pivotable relative to the support member.

The first pivot arm 132e of the pivot mechanism 130e is pivotably connected to both the driving portion 78e of the first linear actuator 74e and a first end 96e of a first link 88e. A second end 100e of the first link 88e is pivotably connected to a first end 102e of the first pivot extension 92e. A second end 110e of the first pivot extension 92e is pivotably connected to the first support arm 54e. The second pivot arm 134e of the pivot mechanism 130e is pivotably connected to both the driving portion 78e of the second linear actuator 75e and a first end 104e of a second link 90e. A second end 106e of the second link 90e is pivotably connected to a first end 108e of the second pivot extension 94e. A second end 112e of the second pivot extension 94e is pivotably connected to the first support arm 54e.

As shown in FIGS. 23-26, with the steering wheel 14e in the steering position, actuation of the first and second linear actuators 74e, 75e causes the first and second rim portions 26e, 28e to pivot relative to the support member 50e from the steering position to the folded position. Upon actuation of the first and second linear actuators 74e, 75e, the driving portions 78e linearly move relative to the mounting portions 76e away from the base portion 52e of the support member 50e. The linearly moving driving portion 78e of the first linear actuator 74e pivots the first pivot arm 132e of the pivot mechanism 130e in the clockwise direction CW relative to the support member 50e. The first linear actuator 74e also pivots in the clockwise direction CW relative to the support member 50e.

The first linear actuator 74e also causes the first link 88e to pivot the first pivot extension 92e in the counterclockwise direction CCW relative to the support member 50e. As the first pivot extension 92e pivots relative to the support member 50e, the first rim portion 26e pivots in the counterclockwise direction CCW relative to the support member 50e from the steering position to the folded position. The first rim portion 26e pivots about a first pivot axis 114e relative to the support member 50e.

The linearly moving driving portion 78e of the second linear actuator 75e pivots the second pivot arm 134e of the pivot mechanism 130e in the counterclockwise direction CCW relative to the support member. The second linear actuator 75e pivots in the counterclockwise direction CCW relative to the support member 50e. The second linear actuator 75e causes the second link 90e to pivot the second pivot extension 94e in the clockwise direction CW relative to the support member 50e.

As the second pivot extension 94e pivots relative to the support member 50e, the second rim portion 28e pivots in the clockwise direction CW relative to the support member 50e from the steering position to the folded position. The second rim portion 28e pivots about a second pivot axis 116e relative to the support member 50e. The first and second pivot axes 114e, 116e extend generally parallel to each other and transverse to the steering axis 16e.

Figure 26:
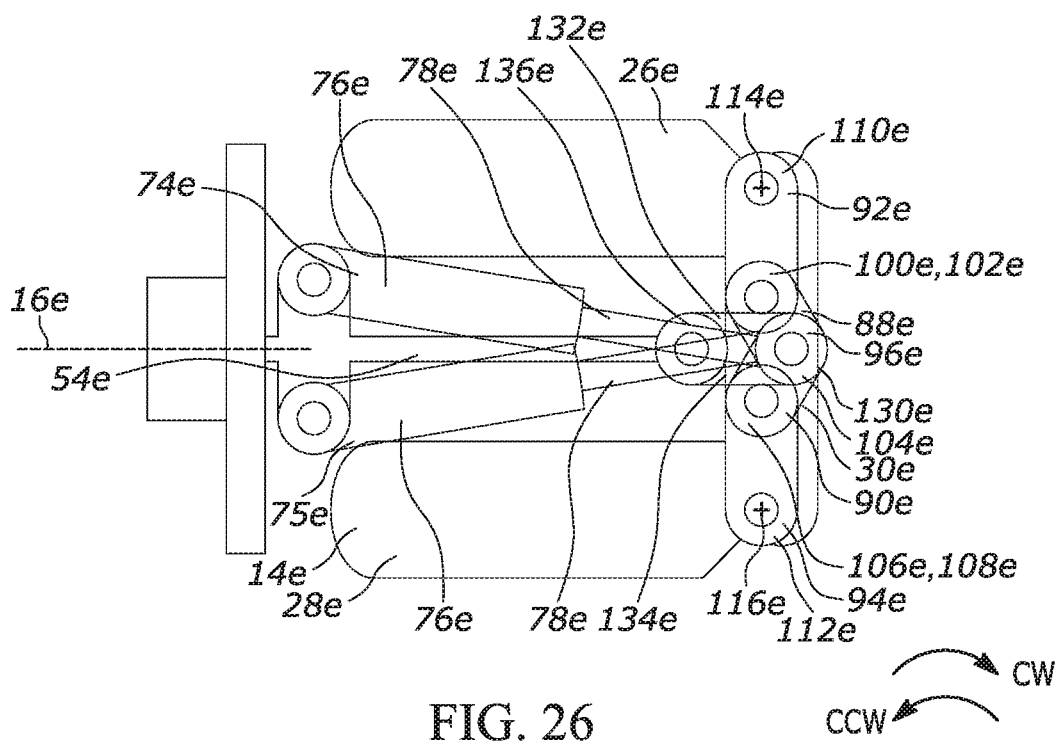
FIG. 26 is a schematic side view of the example configuration of the steering wheel assembly of FIG. 25, including the steering wheel in the second position.
Figure 27:
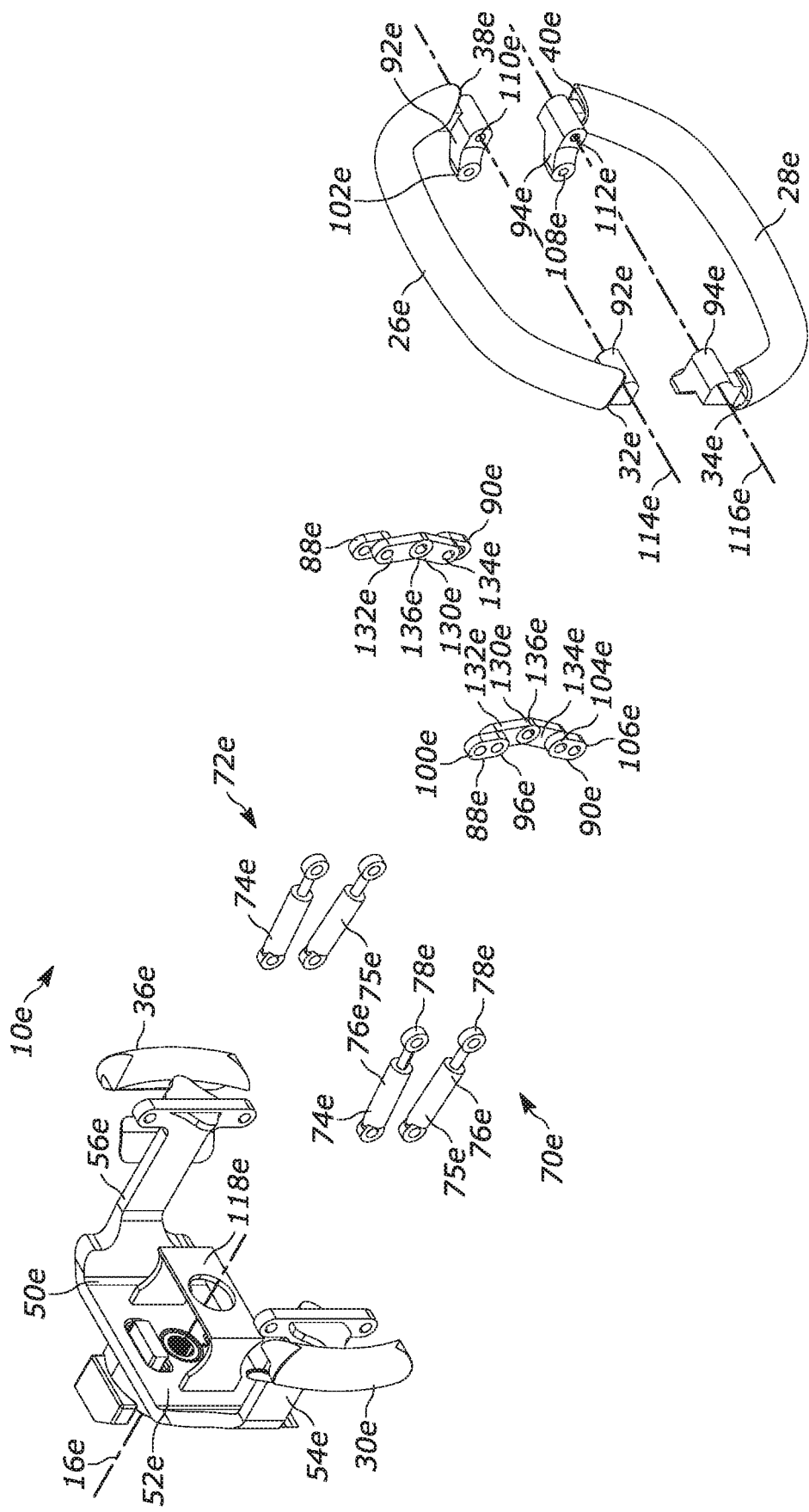
FIG. 27 is an exploded view of the steering wheel assembly of FIG. 23.

As shown in FIGS. 25-26, the pivotable connection between the driving portion 78e of the first linear actuator 74e, the first link 88e and the first pivot arm 132e can be coextensive with the pivotable connection between the driving portion 78e of the second linear actuator 75e, the second link 90e and the second pivot arm 134e when the steering wheel 14e is in the folded position.

The first and second linear actuators 74e, 75e can be actuated to reverse the above described process and cause the first and second rim portions 26e, 28e to pivot about the first and second pivot axes 114e, 116e, respectively, relative to the support member 50e from the folded position to the steering position.

FIGS. 28-32 depict another example steering wheel assembly 10f. The support member 50f of the steering wheel assembly 10f is substantially similar to the support member 50c of steering wheel assembly 10c. First ends 32f, 34f of the first and second rim portions 26f, 28f of a steering wheel 14f are connected to the first support arm 54f by links 88f, 90f. Second ends 38f, 40f of the first and second rim portions 26f, 28*f* are connected to the second support arm 56*f* by other links 88*f*, 90*f*. A first central rim portion 30*f* is connected to the first support arm 54*f*. A second central rim portion 36*f* is connected to the second support arm 56*f*.

Figure 28:
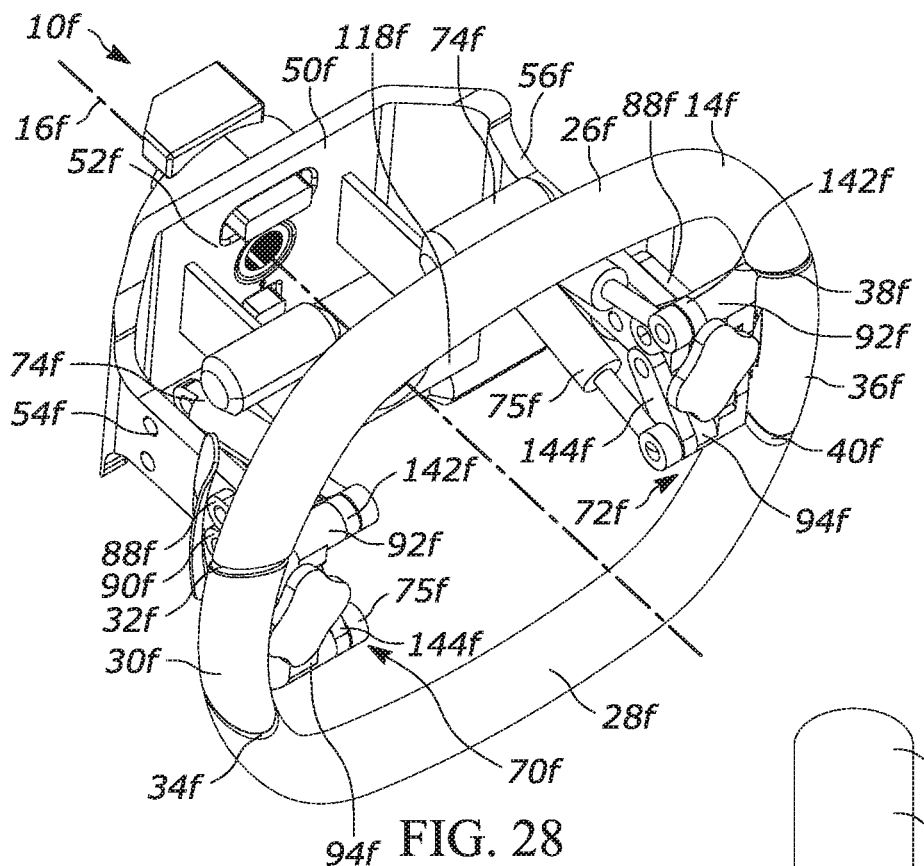
FIG. 28 is a partial perspective view of an example configuration of the steering wheel assembly of FIG. 1, including the steering wheel in the first position.
Figure 29:
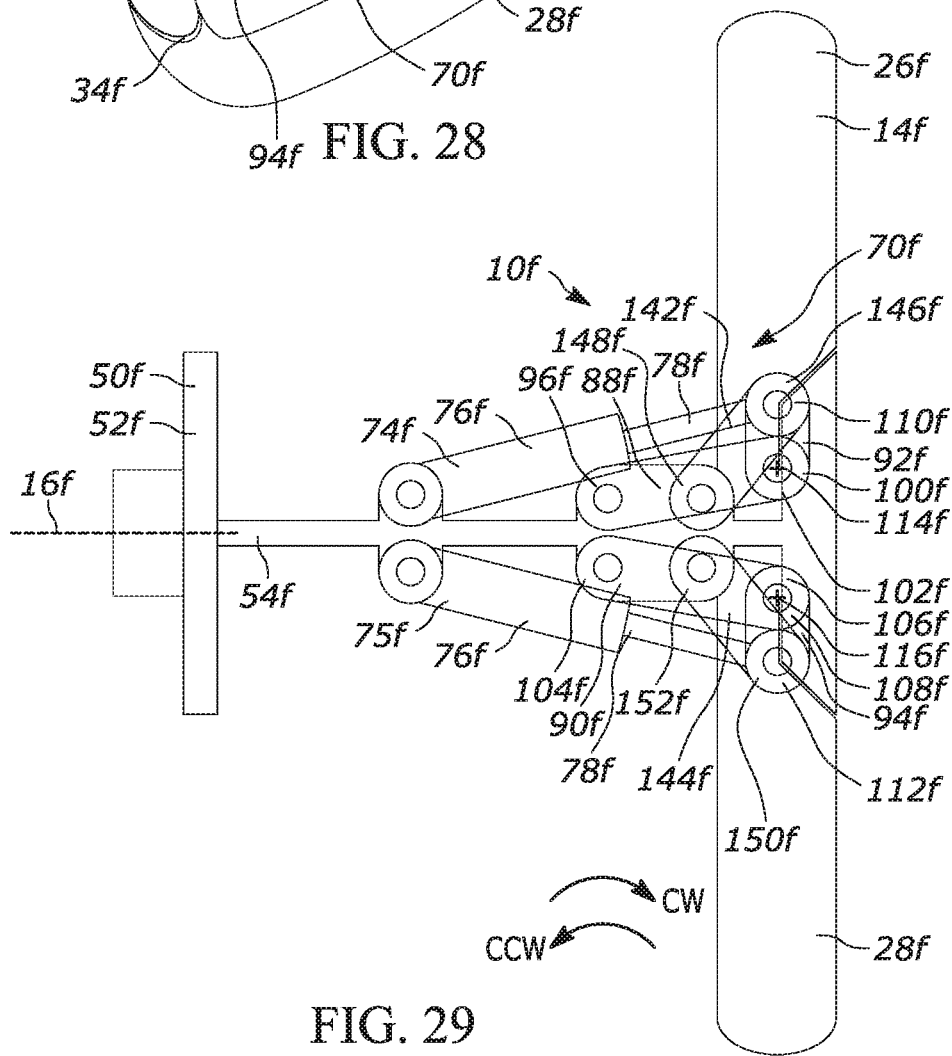
FIG. 29 is a schematic side view of the example configuration of the steering wheel assembly of FIG. 28, including the steering wheel in the first position.
Figure 30:
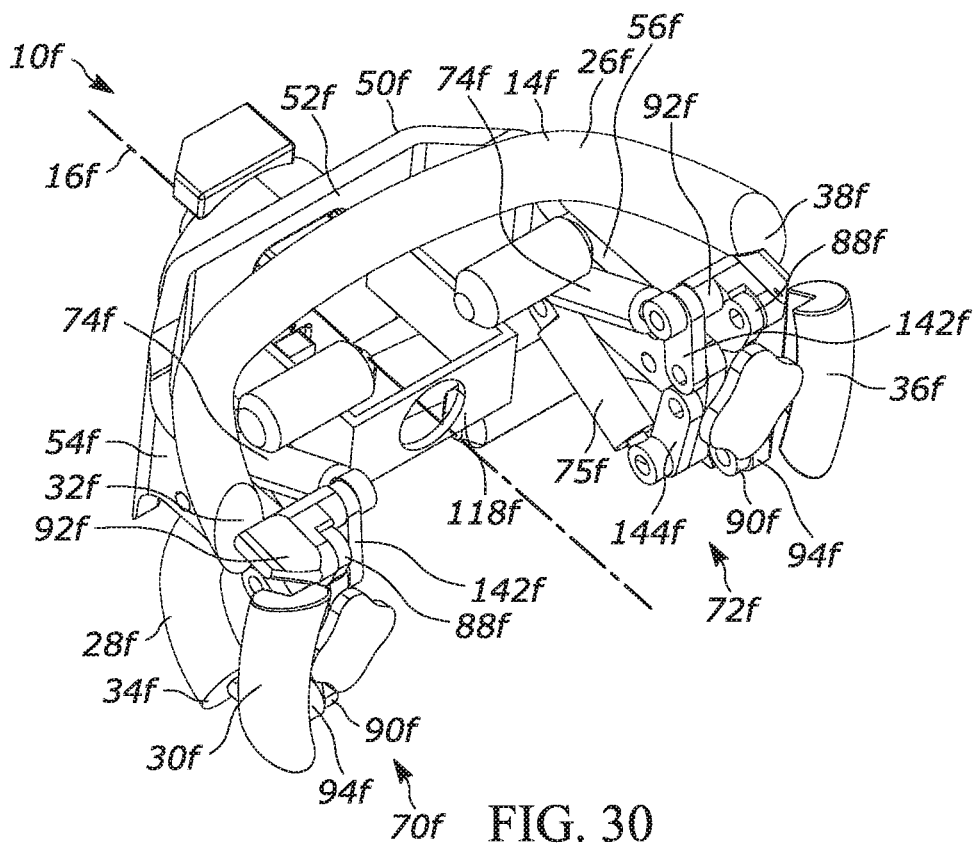
FIG. 30 is a partial perspective view of the example configuration of the steering wheel assembly of FIG. 28, including the steering wheel in the second position.
Figure 31:
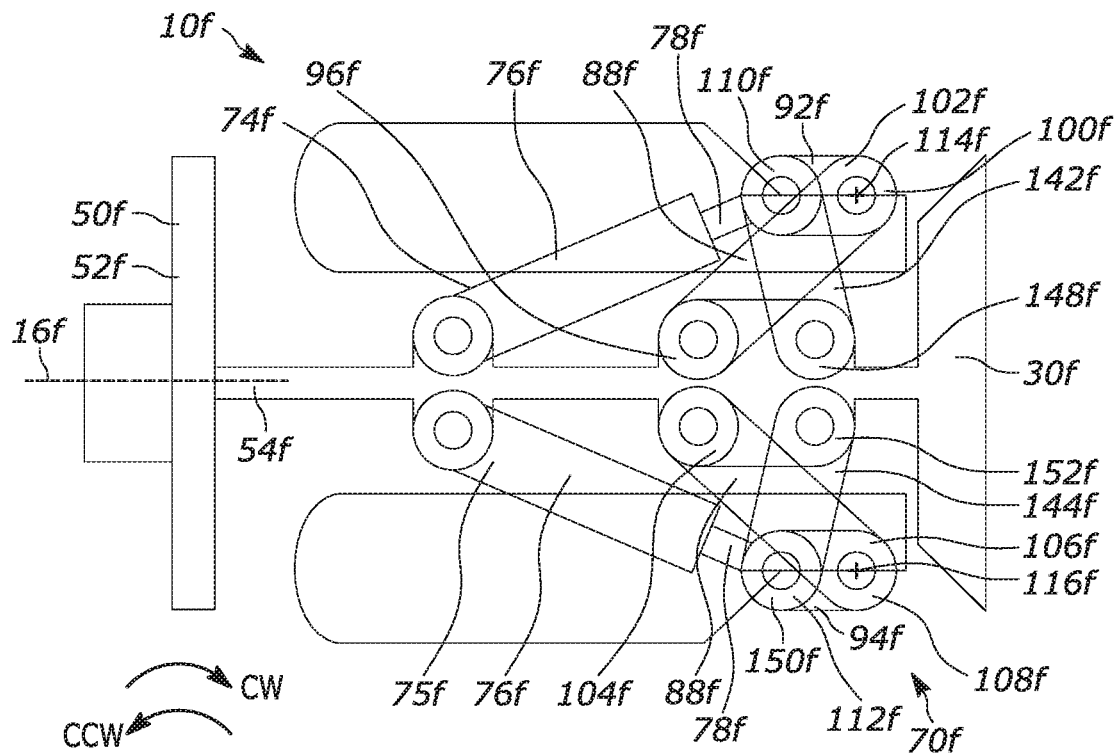
FIG. 31 is a schematic side view of the example configuration of the steering wheel assembly of FIG. 30, including the steering wheel in the second position.
Figure 32:
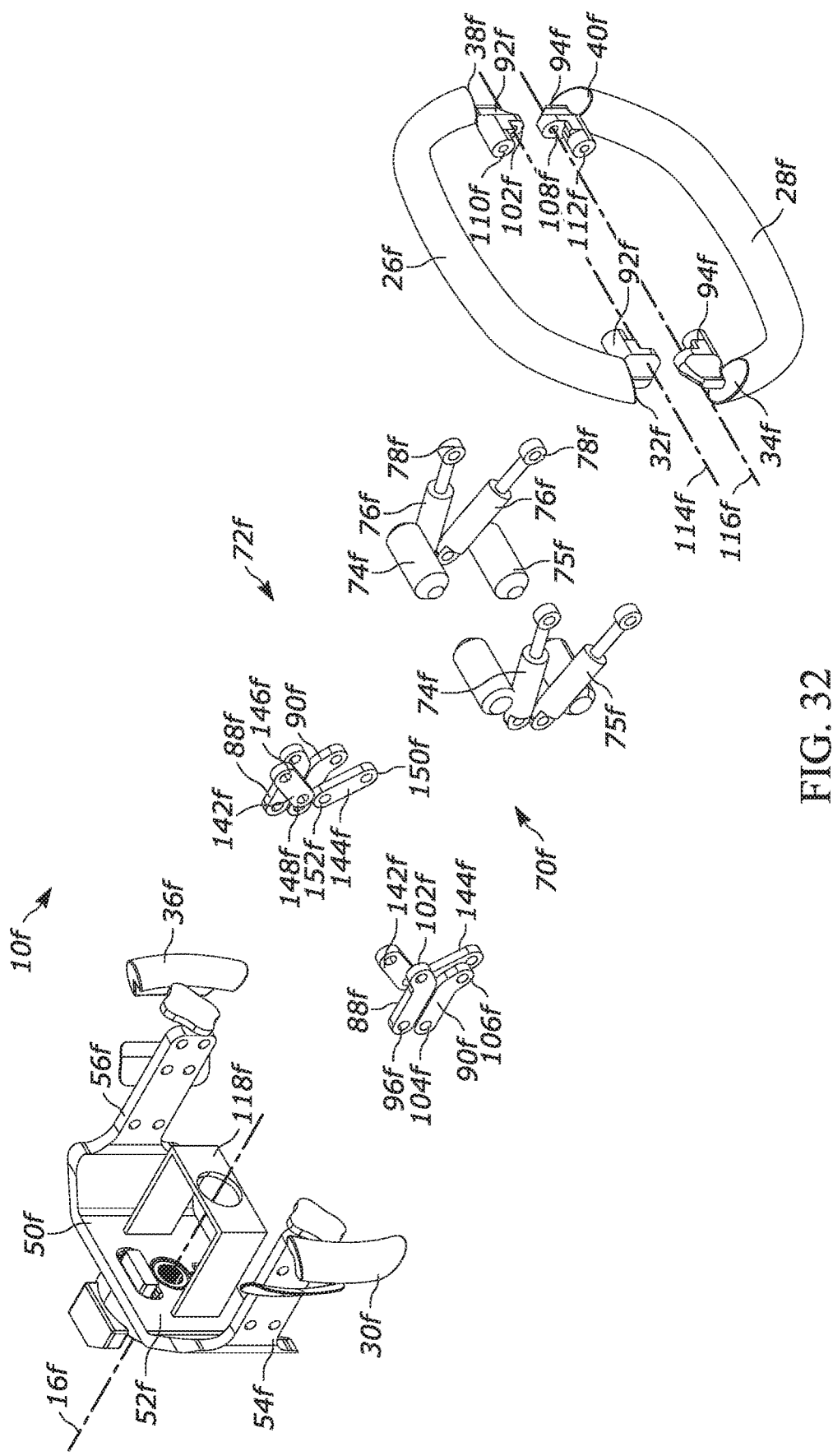
FIG. 32 is an exploded view of the steering wheel assembly of FIG. 28.

The steering wheel 14*f* can be moved between the steering and folded positions by switching portions 70*f*, 72*f* of the steering wheel assembly 10*f*. As shown in FIGS. 28 and 30, the steering wheel assembly 10*f* has a first switching portion 70*f* adjacent the first support arm 54*f* and a second switching portion 72*f* adjacent the second support arm 56*f*. The first and second switching portions 70*f*, 72*f* mirror one another and operate in a similar manner. Thus, for the sake of brevity, only the first switching portion 70*f* will be described below.

As shown in FIGS. 28-32, the first switching portion 70*f* includes first and second linear actuators 74*f*, 75*f* each having a mounting portion 76*f* and a driving portion 78*f*. Each mounting portion 78*f* of the first and second linear actuators 74*f*, 75*f* is pivotably connected to the first support arm 54*f*. The driving portion 78*f* of the first linear actuator 74*f* is operably connected to the first end 32*f* of the first rim portion 28*f*. The driving portion 78*f* of the second linear actuator 75*f* is operably connected to the first end 34*f* of the second rim portion 28*f*.

The first link 88*f* has a first end 96*f* pivotably connected to the first support arm 54*f* of the support member 50*f*. A second end 100*f* of the first link 88*f* is pivotably connected to a first end 102*f* of a first pivot extension 92*f*. The first pivot extension 92*f* is on the first end 32*f* of the first rim portion 26*f*. A second end 110*f* of the first pivot extension 92*f* is pivotably connected to the driving portion 78*f* of the first linear actuator 74*f*. The second end 110*f* of the first pivot extension 92*f* is also pivotably connected to a first end 146*f* of a first pivot arm 142*f*. A second end 148*f* of the first pivot arm 142*f* is pivotably connected to the first support arm 54*f*.

The second link 90*f* has a first end 104*f* pivotably connected to the first support arm 54*f* of the support member 50*f*. A second end 106*f* of the second link 90*f* is pivotably connected to a first end 108*f* of a second pivot extension 94*f*. The second pivot extension 94*f* is on the first end 34*f* of the second rim portion 28*f*. A second end 112*f* of the second pivot extension 94*f* is pivotably connected to the driving portion 78*f* of the second linear actuator 75*f*. The second end 112*f* of the second pivot extension 94*f* is also pivotably connected to a first end 150*f* of a second pivot arm 144*f*. A second end 152*f* of the second pivot arm 144*f* is pivotably connected to the first support arm 54*f*.

As shown in FIGS. 28-31, with the steering wheel 14*f* in the steering position, actuation of the first and second linear actuators 74*f*, 75*f* causes the first and second rim portions 26*f*, 28*f* to pivot relative to the support member 50*f* from the steering position to the folded position. Upon actuation of the first and second linear actuators 74*f*, 75*f*, the driving portions 78*f* linearly move relative to the mounting portions 76*f* toward the base portion 52*f* of the support member 50*f*. The linearly moving driving portion 78*f* of the first linear actuator 74*f* pivots the first pivot arm 142*f* in the counterclockwise direction CCW relative to the support member. The first linear actuator 74*f* pivots in the counterclockwise direction CCW relative to the support member 50*f*. The first pivot extension 92*f* pivots in the counterclockwise direction relative to the second end 100*f* of the first link 88*f*. The first link 88*f* also pivots in the counterclockwise direction CCW relative to the support member 50*f*. The first rim portion 26*f* pivots in the counterclockwise direction CCW relative to the first link 88*f* from the steering position to the folded position. The first rim portion 26*f* pivots about a first pivot axis 114*f* relative to the first link 88*f*.

The linearly moving driving portion 78*f* of the second linear actuator 75*f* pivots the second pivot arm 144*f* in the clockwise direction CW relative to the support member. The second linear actuator 75*f* pivots in the clockwise CW direction relative to the support member 50*f*. The second pivot extension 94*f* pivots in the clockwise direction CW relative to the second end 106*f* of the second link 90*f*. The second link 90*f* also pivots in the clockwise direction CW relative to the support member 50*f*. The second rim portion 28*f* pivots in the clockwise direction CW relative to the second link 90*f* from the steering position to the folded position. The second rim portion 28*f* pivots about a second pivot axis 116*f* relative to the second link 90*f*. The first and second pivot axes 114*f*, 116*f* extend generally parallel to each other and transverse to the steering axis 16*f*.

The first and second linear actuators 74*f*, 75*f* can be actuated to reverse the above described process and cause the first and second rim portions 26*f*, 28*f* to pivot about the first and second pivot axes 114*f*, 116*f*, respectively, relative to the first and second links 88*f*, 90*f* from the folded position to the steering position.

FIGS. 33-37 depict another example of the steering wheel assembly 10*g*. The support member 50*g* of the steering wheel assembly 10*g* is substantially similar to the support member 50*a* of steering wheel assembly 10*a*. However, the support member 50*g* does not include first and second guide channels. The first and second support arms 54*g*, 56*g* of the support member 50*g* instead have first and second guide openings 158*g*, 160*g*, respectively, that guide linear movement of a carriage 58*g* relative to the support member 50*g*.

First and second rim portions 26*g*, 28*g* of a steering wheel 14*g* have first ends 32*g*, 34*g* connected to the first support arm 54*g* by links 88*g*, 90*g*. Second ends 38*g*, 40*g* of the first and second rim portions 26*g*, 28*g* are connected to the second support arm 56*g* by other links 88*g*, 90*g*. First and second central rim portions 30*g*, 36*g* of the steering wheel 14*g* are connected to the carriage 58*g*.

The carriage 58*g* includes a base portion 60*g* and first and second carriage arms 62*g*, 64*g* that extend from the base portion. The first and second carriage arms 62*g*, 64*g* extend generally parallel to each other and the steering axis 16*g*. The first carriage arm 62*g* has a first guide bar 162*g* connected thereto that extends generally parallel to the first carriage arm. The first guide bar 162*g* slides in the first guide opening 158*g* of the first support arm 54*g*. The second carriage arm 64*g* has a second guide bar 164*g* connected thereto that extends generally parallel to the second carriage arm. The second guide bar 164*g* slides in the second guide opening 160*g* of the second support arm 56*g*.

Figure 33:
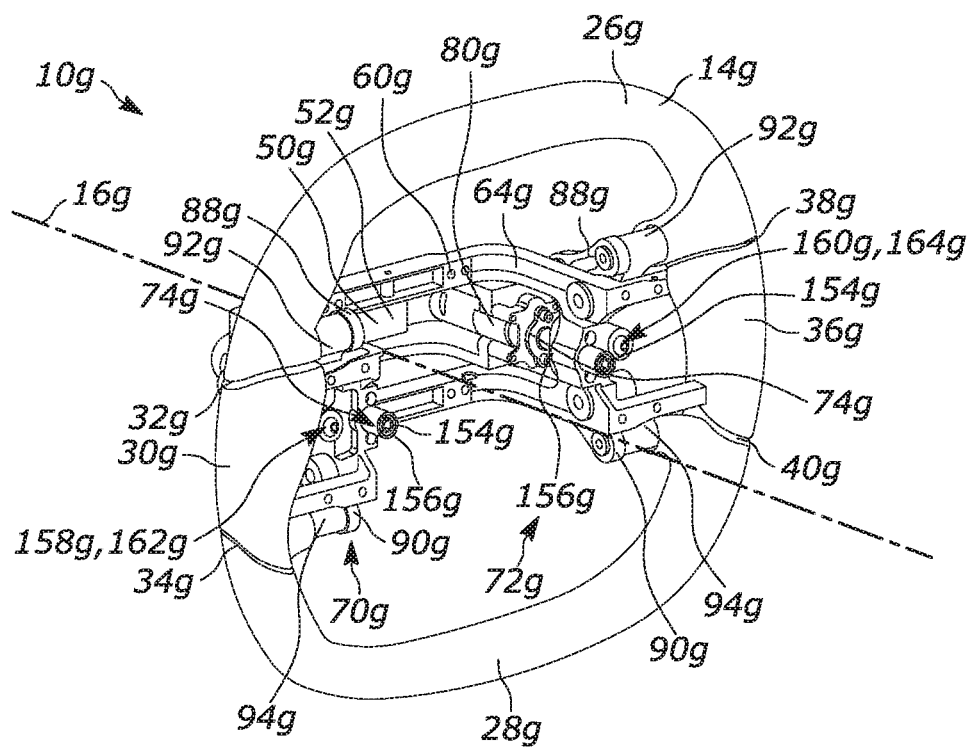
FIG. 33 is a partial perspective view of an example configuration of the steering wheel assembly of FIG. 1, including the steering wheel in the first position.
Figure 34:
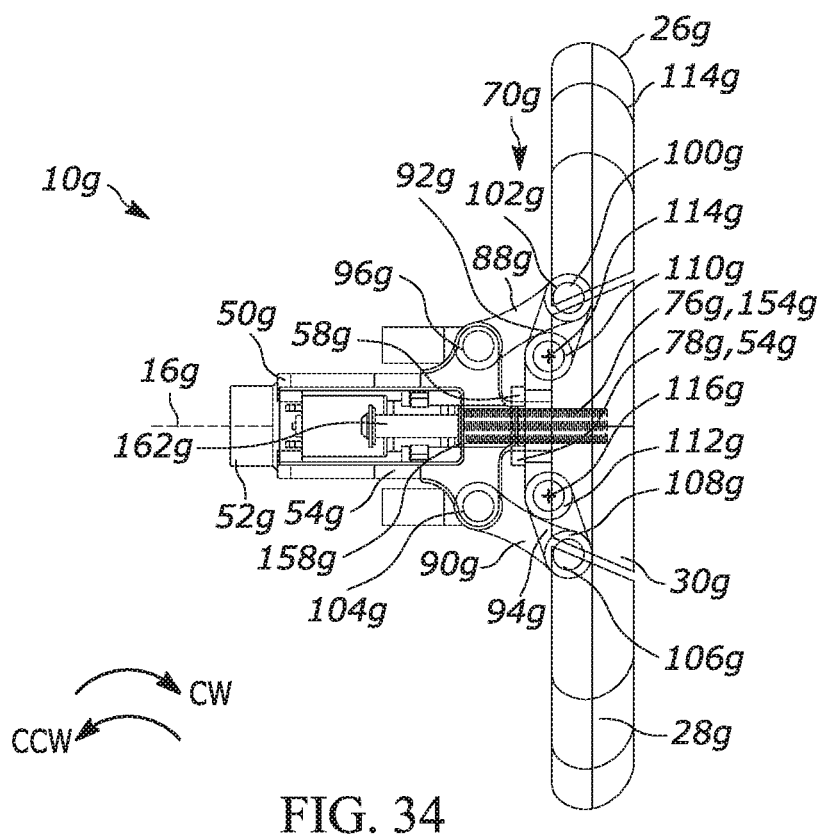
FIG. 34 is a schematic side view of the example configuration of the steering wheel assembly of FIG. 33, including the steering wheel in the first position.
Figure 35:
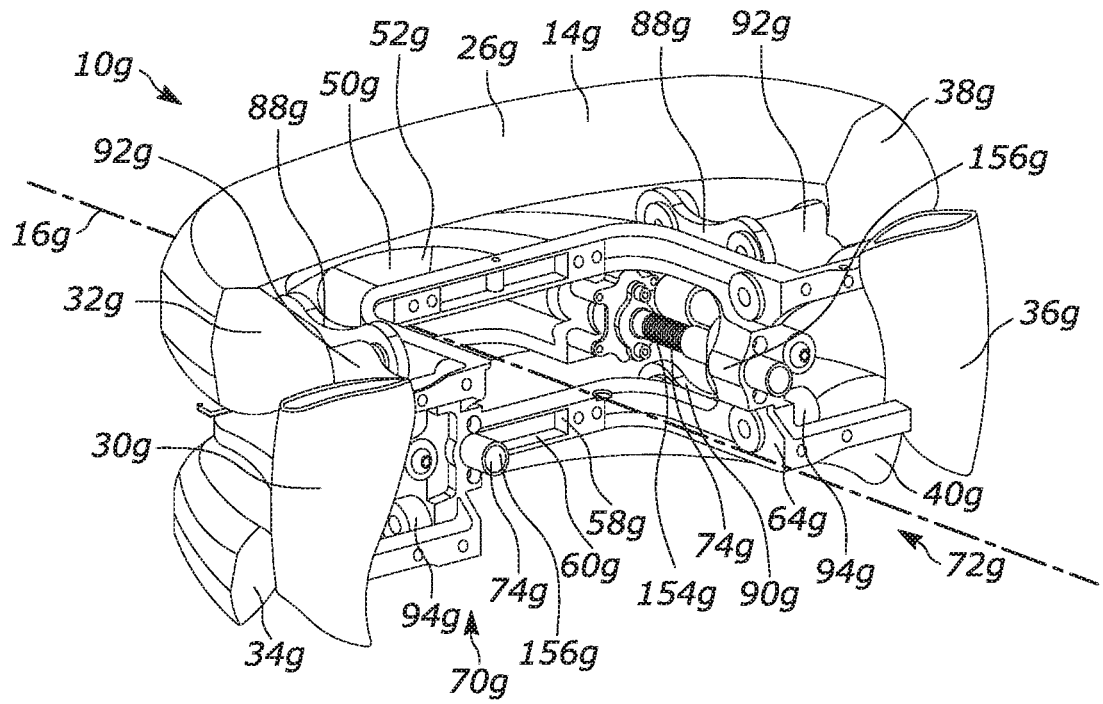
FIG. 35 is a partial perspective view of the example configuration of the steering wheel assembly of FIG. 33, including the steering wheel in the second position.
Figure 36:
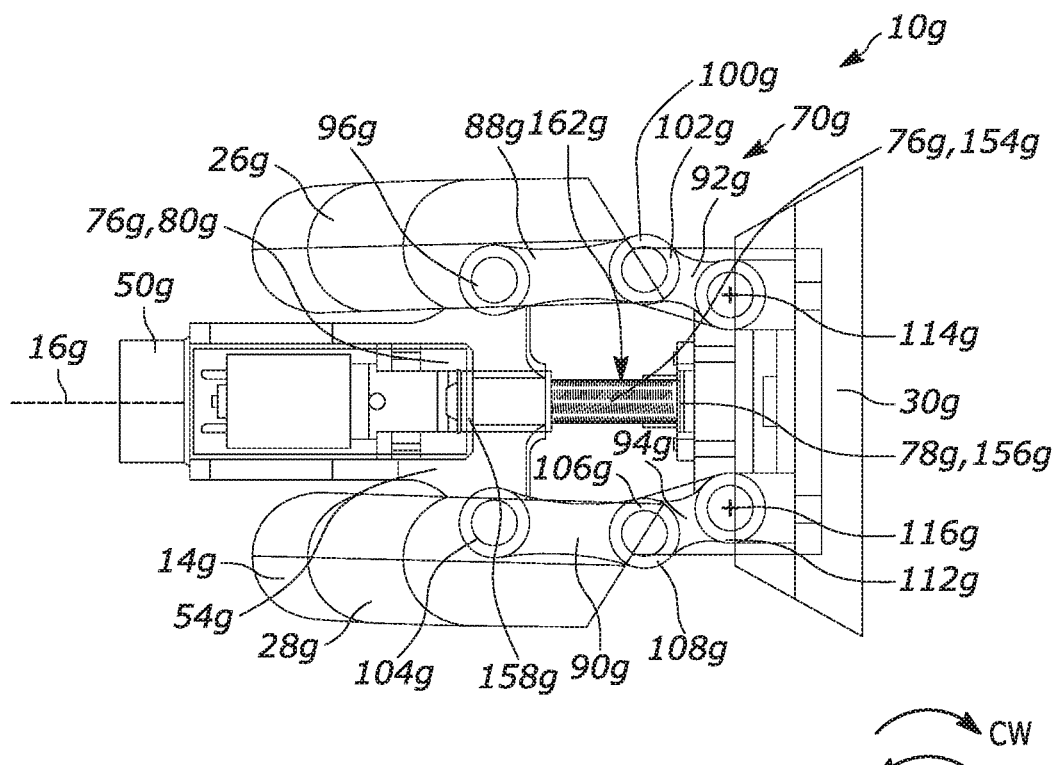
FIG. 36 is a schematic side view of the example configuration of the steering wheel assembly of FIG. 35, including the steering wheel in the second position.
Figure 37:
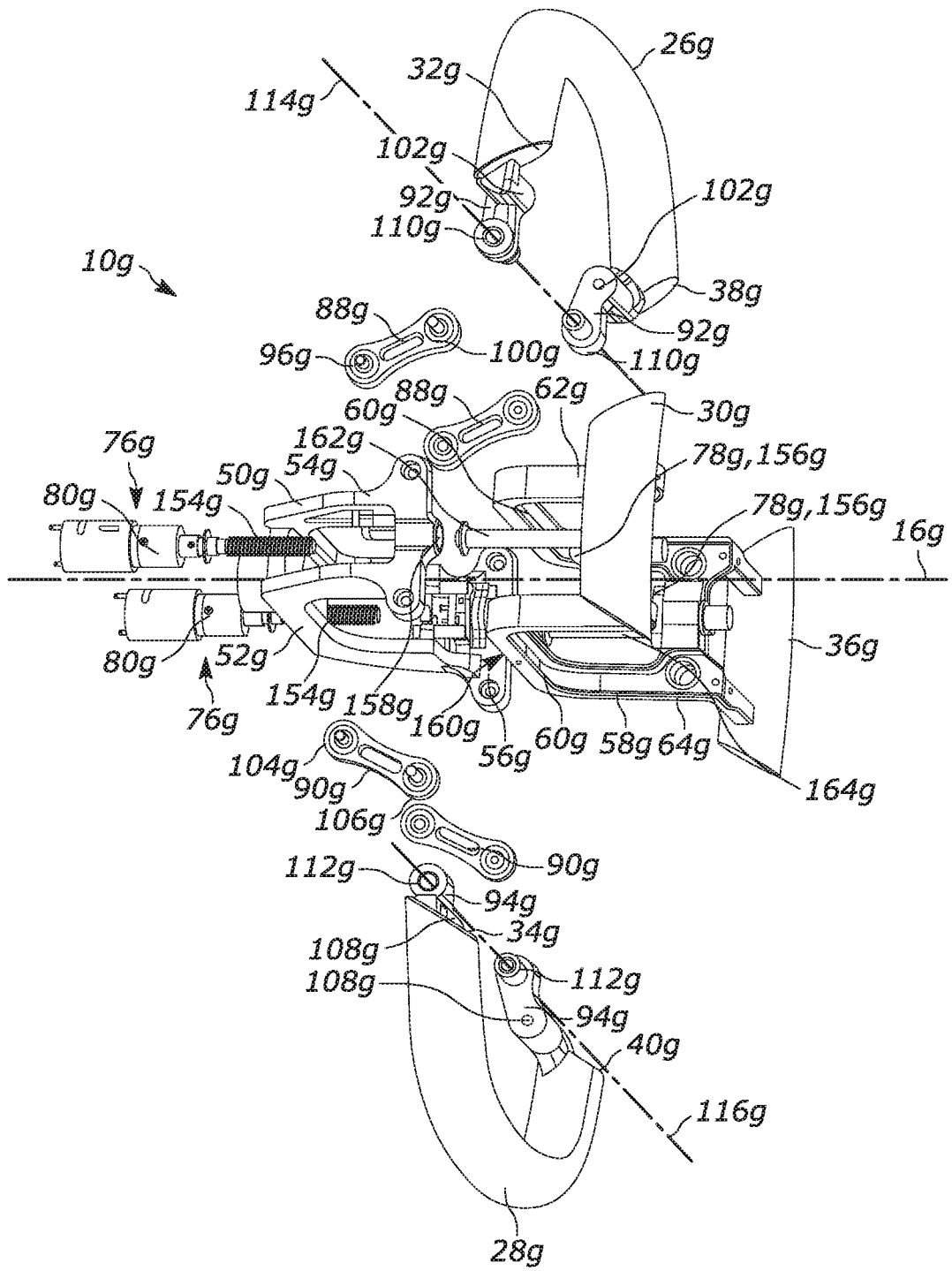
FIG. 37 is an exploded view of the steering wheel assembly of FIG. 33.

The steering wheel 14*g* can be moved between the steering and folded positions by switching portions 70*g*, 72*g* of the steering wheel assembly 10*g*. As shown in FIGS. 33 and 35, the steering wheel assembly 10*g* has a first switching portion 70*g* adjacent the first support arm 54*g* and a second switching portion 72*g* adjacent the second support arm 56*g*. The first and second switching portions 70*g*, 72*g* mirror one another and operate in a similar manner. Thus, for the sake of brevity, only the first switching portion 70*g* will be described below.

As shown in FIGS. 33-37, the first switching portion 70*g* includes a linear actuator 74*g* having a mounting portion 76*g* and a driving portion 78*g*. The mounting portion 76*g* of the linear actuator 74*g* can include a leadscrew 154*g* rotatably connected to a housing 80*g*. The housing 80*g* is fixedly connected to the support member 50g. The driving portion 78g of the linear actuator 74g can include a leadscrew nut 156g that is connected and linearly movable relative to the leadscrew 154g. The leadscrew nut 156g is fixedly connected to the first carriage arm 62g. The linear actuator 74g can be electrically, hydraulically, and/or pneumatically powered. The linear actuator 74g can be electrically connected to a controller that actuates the linear actuator 74g when the vehicle occupant desires and/or when certain vehicle conditions are met, such as when the vehicle 12 is parked.

A first end 96g of the first link 88g is pivotably connected to the first support arm 54g. A second end 100g of the first link 88g is pivotably connected to a first end 102g of a first pivot extension 92g. The first pivot extension 92g is on the first end 32g of the first rim portion 26g.

A first end 104g of the second link 90g is pivotably connected to the first support arm 54g. A second end 106g of the second link 90g is pivotably connected to a first end 108g of a second pivot extension 94g. The second pivot extension 94g is on the first end 34g of the second rim portion 28g. Second ends 110g, 112g of the first and second pivot extensions 92g, 94g are pivotably connected to the first carriage arm 62g.

As shown in FIGS. 33-36, with the steering wheel 14g in the steering position, actuation of the linear actuator 74g causes the first and second rim portions 26g, 28g to pivot relative to the support member 50g from the steering position to the folded position. Upon actuation of the linear actuator 74g, the leadscrew 154g rotates relative to the housing 80g and relative to the leadscrew nut 156g. Rotation of the leadscrew 154g linearly moves the leadscrew nut 156g along the leadscrew away from the base portion 52g of the support member 50g relative to the leadscrew and to the support member. The linearly moving leadscrew nut 156g linearly moves the carriage 58g away from the base portion 52g relative to the support member 50g. The linearly moving carriage 58g causes the first pivot extension 92g to pivot in a counterclockwise direction CCW relative to the second end 100g of the first link 88g. The linearly moving carriage 58g also causes the second pivot extension 94g to pivot in a clockwise direction CW relative to the second end 106g of the second link 90g.

As the first pivot extension 92g pivots relative to the first link 88g, the first rim portion 26g pivots in the counterclockwise direction CCW relative to the carriage 58g from the steering position to the folded position. The first rim portion 26a pivots about a first pivot axis 114g relative to the carriage 58g. As the second pivot extension 94g pivots relative to the second link 90g, the second rim portion 28g pivots in the clockwise direction CW relative to the carriage 58g from the steering position to the folded position. The second rim portion 28g pivots about a second pivot axis 116g relative to the carriage 58g. The first and second pivot axes 114g, 116g extend generally parallel to each other and transverse to the steering axis 16g.

The linear actuator 74g can be actuated to reverse the above described process and cause the first and second rim portions 26g, 28g to pivot about the first and second pivot axes 114g, 116g, respectively, relative to the carriage 58g from the folded position to the steering position.

Figure 38:
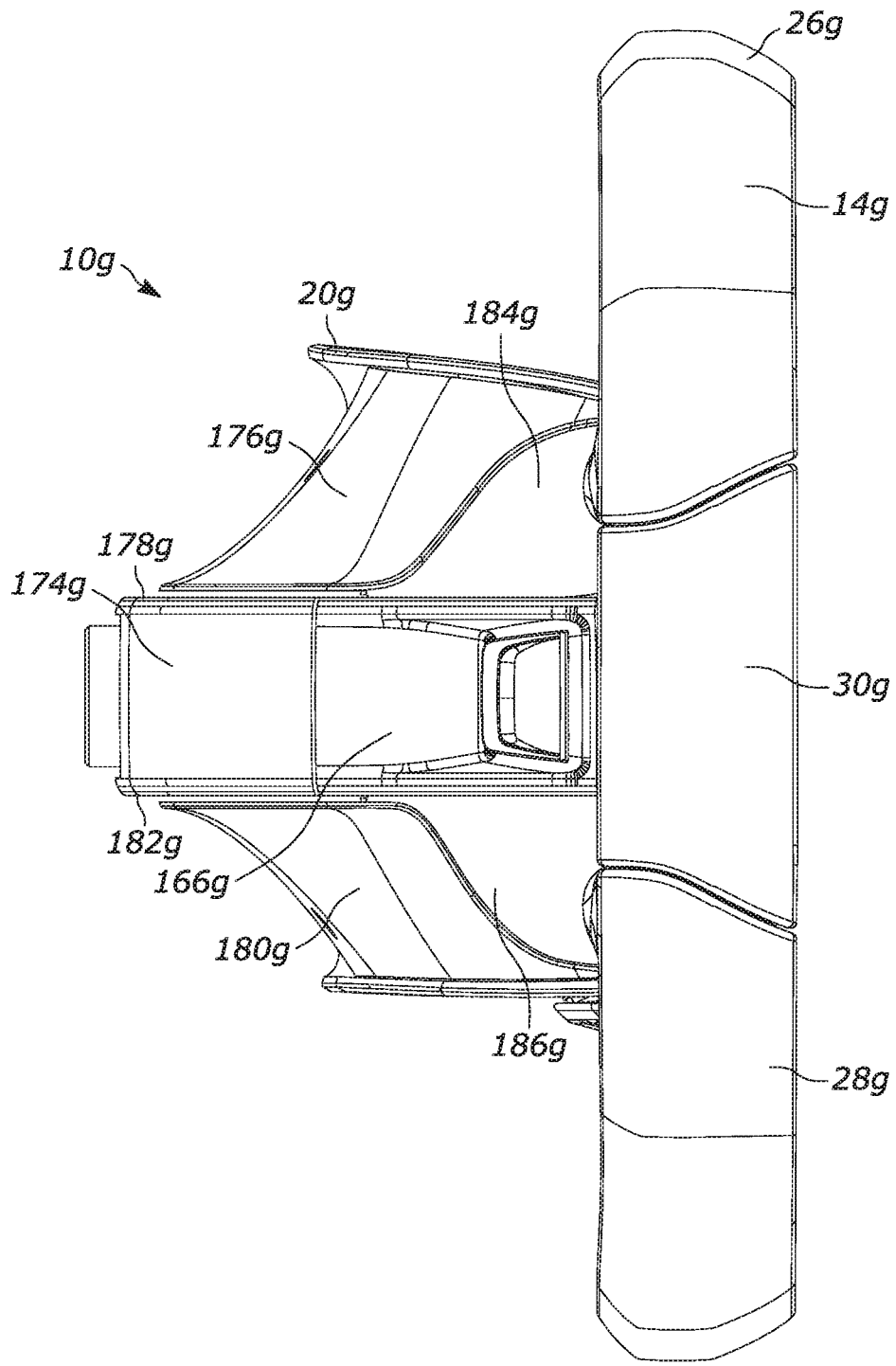
FIG. 38 is a side view of the steering wheel assembly of FIG. 33, including the steering wheel in the first position.
Figure 39:
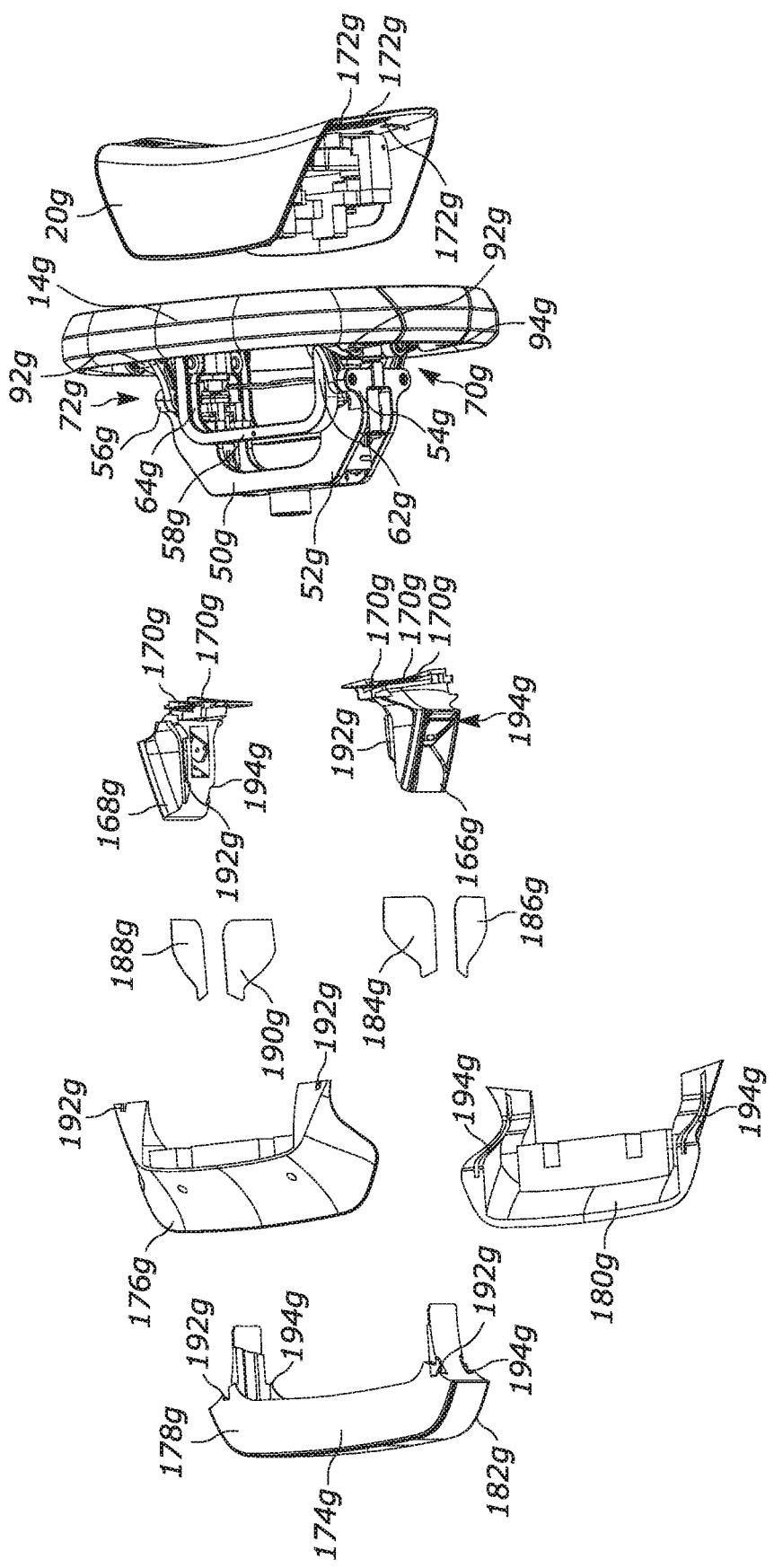
FIG. 39 is an exploded view of the steering wheel assembly of FIG. 38.

As shown in FIGS. 38-39, the housing 20g can be fixedly connected to the carriage 58g so that the housing moves with the carriage relative to the support member 50g. A first switch assembly 166g can be connected to the first carriage arm 62g. A second switch assembly 168g can be connected to the second carriage arm 64g. The first and second switch assemblies 166g, 168g include occupant actuatable switches 170g that extend through openings 172g in the housing 20g.

A first cover 174g can be fixedly attached to the base portion 52g and the first and second support arms 54g, 56g. A second cover 176g can be fixedly attached to the housing 20g and extend toward a first surface 178g of the first cover 174g. A third cover 180g can be fixedly attached to the housing 20g and extend toward a second surface 182g of the first cover 174g. The second surface 182g of the first cover 174g is opposite the first surface 178g. The first, second, and third covers 174g, 176g, 180g together with the housing 20g cover and enclose portions of the support member 50g, the carriage 58g, the first switching portion 70g and the second switching portion 72g.

First and second flexible inserts 184g, 186g may be provided to overlie and cover portions of the first switching portion 70g, the support member 50g and/or the carriage 58g. Third and fourth flexible inserts 188g, 190g may be provided to overlie and cover portions of the second switching portion 72g, the support member 50g and/or the carriage 58g. The third and fourth flexible inserts 188g, 190g mirror the first and second flexible inserts 184g, 186g and operate in a similar manner. Thus, for the sake of brevity, only the first and second flexible inserts 184g, 186g will be described below.

The first flexible insert 184g is held within, such as by being press fit or by adhesive bonding, a first channel 192g that extends along the first cover 174g, the second cover 176g and the first switching assembly 166g. The first flexible insert 184g can also be attached to the first pivot extension 92g. The second flexible insert 186g is held within, such as by being press fit or by adhesive bonding, a second channel 194g that extends along the first cover 174g, the third cover 180g and the first switching assembly 166g. The second flexible insert 186g can also be attached to the second pivot extension 94g. Alternatively, the first and second flexible inserts 184g, 186g can be attached to the steering wheel assembly 10g in any other desired manner.

The first and second flexible inserts 184g, 186g may have an elastic wire frame for press fitting the first and second flexible inserts in the first and second channels 192g, 194g. The first and second flexible inserts 184g, 186g can be at least partially formed from one or more deformable, flexible and/or stretchable materials, such as leather or elastic fabrics. Therefore, the first flexible insert 184g can flex, deform and/or stretch to conform to the movements of the second cover 176g, the first switching assembly 166g and the first pivot extension 92g. Similarly, the second flexible insert 186g can flex, deform and/or stretch to conform to the movements of the third cover 180g, the first switching assembly 166g and the second pivot extension 94g. The first and second flexible inserts 184g, 186g can thus flex as the steering wheel 14g is pivoted between the steering and folded positions to cover portions of the steering wheel assembly 10g regardless of whether the steering wheel is in the steering position, in the folded position or transitioning between the steering and folded positions.

From the above description of the invention, those skilled in the art will perceive improvements, changes and modifications. Such improvements, changes and modifications within the skill of the art are intended to be covered by the appended claims.

Having described the invention, the following is claimed:
1. A steering wheel assembly for a vehicle, comprising:
a support member connectable to a vehicle steering column;

a steering wheel having first and second rim portions pivotable about first and second pivot axes, respectively, between a steering position and a folded position;

at least one linear actuator connected to the support member and operably connected to the first and second rim portions, actuation of the at least one linear actuator pivoting the first and second rim portions about the first and second pivot axes;

a first link having a first end connected to the support member;

a second link having a first end connected to the support member;

a first pivot extension on an end of the first rim portion, a first end of the first pivot extension being pivotably connected to a second end of the first link, a second end of the first pivot extension being operably connected to the at least one linear actuator, linear motion of the at least one linear actuator causing the first pivot extension to pivot relative to the second end of the first link, the first rim portion pivoting relative to the support member as the first pivot extension pivots relative to the second end of the first link; and a second pivot extension on an end of the second rim portion, a first end of the second pivot extension being pivotably connected to a second end of the second link, a second end of the second pivot extension being operably connected to the at least one linear actuator, the linear motion of the at least one linear actuator causing the second pivot extension to pivot relative to the second end of the second link, the second rim portion pivoting relative to the support member as the second pivot extension pivots relative to the second end of the second link.

2. The steering wheel assembly recited in claim 1, further comprising a carriage connected to the at least one linear actuator so that the linear motion of the at least one linear actuator linearly moves the carriage relative to the support member, the second ends of the first and second pivot extensions being connected to the carriage, linear motion of the carriage causing the first pivot extension to pivot relative to the second end of the first link and the second pivot extension to pivot relative to the second end of the second link.

3. The steering wheel assembly recited in claim 2, wherein the at least one linear actuator has a mounting portion and a driving portion, the mounting portion of the at least one linear actuator being connected to the support member, the driving portion of the at least one linear actuator being connected to the carriage, linear motion of the driving portion relative to the mounting portion causing the carriage to linearly move relative to the support member.

4. The steering wheel assembly recited in claim 2, wherein the at least one linear actuator has a leadscrew and a leadscrew nut, the leadscrew being rotatably connected to the support member, the leadscrew nut being fixedly connected to the carriage, the leadscrew nut being connected and linearly movable relative to the leadscrew, the leadscrew rotating relative to the leadscrew nut upon actuation of the at least one linear actuator, rotation of the leadscrew causing the leadscrew nut to linearly move on the leadscrew relative to the leadscrew, linear motion of the leadscrew nut causing the carriage to linearly move relative to the support member.

5. The steering wheel assembly recited in claim 2, wherein the carriage includes a base portion and first and second carriage arms that extend from the base portion, the first carriage arm having a first central rim portion connected thereto, the first central rim portion extending between first ends of the first and second rim portions when the first and second rim portions are in the steering position, the second carriage arm having a second central rim portion connected thereto, the second central rim portion extending between second ends of the first and second rim portions when the first and second rim portions are in the steering position.

6. The steering wheel assembly recited in claim 2, further comprising an airbag module including:

a housing connected to the carriage and linearly movable relative to the support member by the carriage, the housing having a first receiving portion configured to receive the first rim portion when the first rim portion is in the folded position, the housing having a second receiving portion configured to receive the second rim portion when the second rim portion is in the folded position, an airbag being inflatable from a stored condition in which the airbag is stored in the housing to a deployed condition in which the airbag is positioned between a vehicle occupant and the steering wheel, and an inflator in the housing and configured to provide inflation fluid to the airbag.

7. The steering wheel assembly recited in claim 1, wherein the at least one linear actuator includes first and second linear actuators, the first linear actuator being connected to the support member and to the second end of the first pivot extension, linear motion of the first linear actuator pivoting the first pivot extension relative to the second end of the first link, the second linear actuator being connected to the support member and to the second end of the second pivot extension, linear motion of the second linear actuator pivoting the second pivot extension relative to the second end of the second link.

8. The steering wheel assembly recited in claim 7, wherein the first and second linear actuators are pivotably mounted to the support member, the steering wheel assembly further comprising:

a first pivot arm having a first end connected to both the first linear actuator and the second end of the first pivot extension and a second end pivotably connected to the support member, the linear motion of the first linear actuator pivoting the first pivot arm relative to the support member, the first pivot arm pivoting relative to the support member causing the first linear actuator to pivot relative to the support member as the first linear actuator moves linearly, the first linear actuator causing the first pivot extension to pivot relative to the second end of the first link as the first linear actuator linearly moves relative to the support member and pivots relative to the support member; and a second pivot arm having a first end connected to both the second linear actuator and the second end of the second pivot extension and a second end pivotably connected to the support member, the linear motion of the second linear actuator pivoting the second pivot arm relative to the support member, the second pivot arm pivoting relative to the support member causing the second linear actuator to pivot relative to the support member as the second linear actuator moves linearly, the second linear actuator causing the second pivot extension to pivot relative to the second end of the second link as the second linear actuator linearly moves relative to the support member and pivots relative to the support member.

9. The steering wheel assembly recited in claim 8, wherein the first ends of the first and second links are pivotably connected to the support member, the linear motion of the first linear actuator pivoting the first link relative to the support member and the first pivot extension relative to the second end of the first link, the linear motion of the second linear actuator pivoting the second link relative to the support member and the second pivot extension relative to the second end of the second link.

10. The steering wheel assembly recited in claim 1, further comprising at least one flexible insert overlying and covering a portion of the steering wheel assembly, the at least one flexible insert flexing as the steering wheel is pivoted between the steering and folding positions.

11. The steering wheel assembly recited in claim 1, wherein the first and second pivot axes are substantially parallel to each other and transverse to a steering axis of the steering wheel.

12. The steering wheel assembly recited in claim 1, wherein the first and second rim portions extend transverse to a steering axis of the steering wheel when in the steering position, the first and second rim portions extending substantially in the same direction as the steering axis when in the folded position.

13. The steering wheel assembly recited in claim 1, wherein the at least one linear actuator includes a cylinder and a piston rod, the cylinder being connected to the support member, the piston rod being operably connected to the second ends of the of the first and second pivot extensions, linear motion of the piston rod relative to the cylinder causing the first pivot extension to pivot relative to the second end of the first link and the second pivot extension to pivot relative to the second end of the second link.

14. The steering wheel assembly recited in claim 1, wherein the support member includes a base portion connectable to the steering column and first and second support arms extending from the base portion, the first support arm having a first central rim portion connected thereto, the first central rim portion extending between first ends of the first and second rim portions when the first and second rim portions are in the steering position, the second support arm having a second central rim portion connected thereto, the second central rim portion extending between second ends of the first and second rim portions when the first and second rim portions are in the steering position.

15. A steering wheel assembly for a vehicle, comprising:
a support member connectable to a vehicle steering column;
a steering wheel having first and second rim portions pivotable about first and second pivot axes, respectively, between a steering position and a folded position; and
at least one linear actuator connected to the support member and operably connected to the first and second rim portions, actuation of the at least one linear actuator pivoting the first and second rim portions about the first and second pivot axes; wherein
an end of the first rim portion has having a first pivot extension thereon, a first end of the first pivot extension being operably connected to the at least one linear actuator, a second end of the first pivot extension being pivotably connected to the support member, linear motion of the at least one linear actuator causing the first pivot extension to pivot relative to the support member, the first rim portion pivoting relative to the support member as the first pivot extension pivots relative to the support member; and
an end of the second rim portion has having a second pivot extension thereon, a first end of the second pivot extension being operably connected to the at least one linear actuator, a second end of the second pivot extension being pivotably connected to the support member, the linear motion of the at least one linear actuator causing the second pivot extension to pivot relative to the support member, the second rim portion pivoting relative to the support member as the second pivot extension pivots relative to the support member.

16. The steering wheel assembly recited in claim 15, wherein the at least one linear actuator includes first and second linear actuators,
the first linear actuator being connected to the support member and to the first end of the first pivot extension, linear motion of the first linear actuator pivoting the first pivot extension relative to the support member,
the second linear actuator being connected to the support member and to the first end of the second pivot extension, linear motion of the second linear actuator pivoting the second pivot extension relative to the support member.

17. The steering wheel assembly recited in claim 15, further comprising:
a first link having a first end operably connected to the at least one linear actuator and a second end connected to the first end of the first pivot extension, the linear motion of the at least one linear actuator causing the first link to pivot the first pivot extension relative to the support member; and
a second link having a first end operably connected to the at least one linear actuator and a second end connected to the first end of the second pivot extension, the linear motion of the at least one linear actuator causing the second link to pivot the second pivot extension relative to the support member.

18. The steering wheel recited in claim 17, wherein the first ends of the first and second links are coupled to one another by a connecting link, the at least one linear actuator being connected to the connecting link so that the first ends of the first and second links are connected to the at least one linear actuator by the connecting link.

19. The steering wheel assembly recited in claim 17, wherein the at least one linear actuator includes first and second linear actuators,
the first linear actuator being connected to the support member and to the first end of the first link, linear motion of the first linear actuator causing the first link to pivot the first pivot extension relative to the support member,
the second linear actuator being connected to the support member and to the first end of the second link, linear motion of the second linear actuator causing the second link to pivot the second pivot extension relative to the support member.

20. The steering wheel assembly recited in claim 19, wherein the first and second linear actuators are pivotably mounted to the support member, the steering wheel assembly further comprising:
a pivot mechanism having first and second pivot arms that are pivotable relative to a central portion of the pivot mechanism, the central portion of the pivot mechanism being fixedly connected to the support member so that the first and second pivot arms are pivotable relative to the support member,
the first pivot arm of the pivot mechanism being connected to both the first linear actuator and the first end of the first link, the linear motion of the first linear actuator pivoting the first pivot arm relative to the support member, the first pivot arm pivoting relative to the support member causing the first linear actuator to pivot relative to the support member, the first linear actuator causing the first link to pivot the first pivot extension relative to the support member as the first linear actuator linearly moves relative to the support member and pivots relative to the support member, the second pivot arm of the pivot mechanism being connected to both the second linear actuator and the first end of the second link, the linear motion of the second linear actuator pivoting the second pivot arm relative to the support member, the second pivot arm pivoting relative to the support member causing the second linear actuator to pivot relative to the support member, the second linear actuator causing the second link to pivot the second pivot extension relative to the support member as the second linear actuator linearly moves relative to the support member and pivots relative to the support member.

21. The steering wheel assembly recited in claim 15, further comprising at least one flexible insert overlying and covering a portion of the steering wheel assembly, the at least one flexible insert flexing as the steering wheel is pivoted between the steering and folding positions.

22. The steering wheel assembly recited in claim 15, wherein the at least one linear actuator includes a cylinder and a piston rod, the cylinder being connected to the support member, the piston rod being operably connected to the first ends of the first and second pivot extensions, linear motion of the piston rod relative to the cylinder causing each of the first and second pivot extensions to pivot relative to the support member.

23. A steering wheel assembly for a vehicle, comprising:
a support member having a base portion connectable to a vehicle steering column and first and second support arms extending substantially in the same direction as a steering axis from the base portion;
a steering wheel rotatable about the steering axis and having first and second rim portions pivotable about first and second pivot axes, respectively, between a steering position and a folded position, each of the first and second rim portions having a first end adjacent the first support arm and a second end adjacent the second support arm, the first and second pivot axes extending through the first and second ends of the first and second rim portions;
at least one first linear actuator having a first mounting portion connected to the support member adjacent the first support arm and a first driving portion operably connected to the first ends of the first and second rim portions; and
at least one second linear actuator having a second mounting portion connected to the support member adjacent the second support arm and a second driving portion operably connected to the second ends of the first and second rim portions, linear motion of the second driving portion relative to the second mounting portion and the first driving portion relative to the first mounting portion pivoting the first and second rim portions about the first and second pivot axes.

\* \* \* \* \*

UNITED STATES PATENT AND TRADEMARK OFFICE
CERTIFICATE OF CORRECTION

PATENT NO. : 11,453,429 B2  
APPLICATION NO. : 16/851401  
DATED : September 27, 2022  
INVENTOR(S) : Helmstetter et al.

Page 1 of 1

It is certified that error appears in the above-identified patent and that said Letters Patent is hereby corrected as shown below:

On the Title Page

Item (71) Applicants:  
The second applicant reads "ZF Automotive Germany GmbH, Alfdorf (DE)"  
Should read --ZF Automotive Safety Germany GmbH, Aschaffenburg (DE)--

Signed and Sealed this  
Third Day of January, 2023

Katherine Kelly Vidal  
*Director of the United States Patent and Trademark Office*